June 16, 1936. W. W. LASKER 2,044,119
TABULATING MACHINE
Filed May 19, 1931 18 Sheets-Sheet 1

June 16, 1936.  W. W. LASKER  2,044,119
TABULATING MACHINE
Filed May 19, 1931   18 Sheets-Sheet 4

INVENTOR
William W. Lasker
BY Robert H. Strother
ATTORNEY

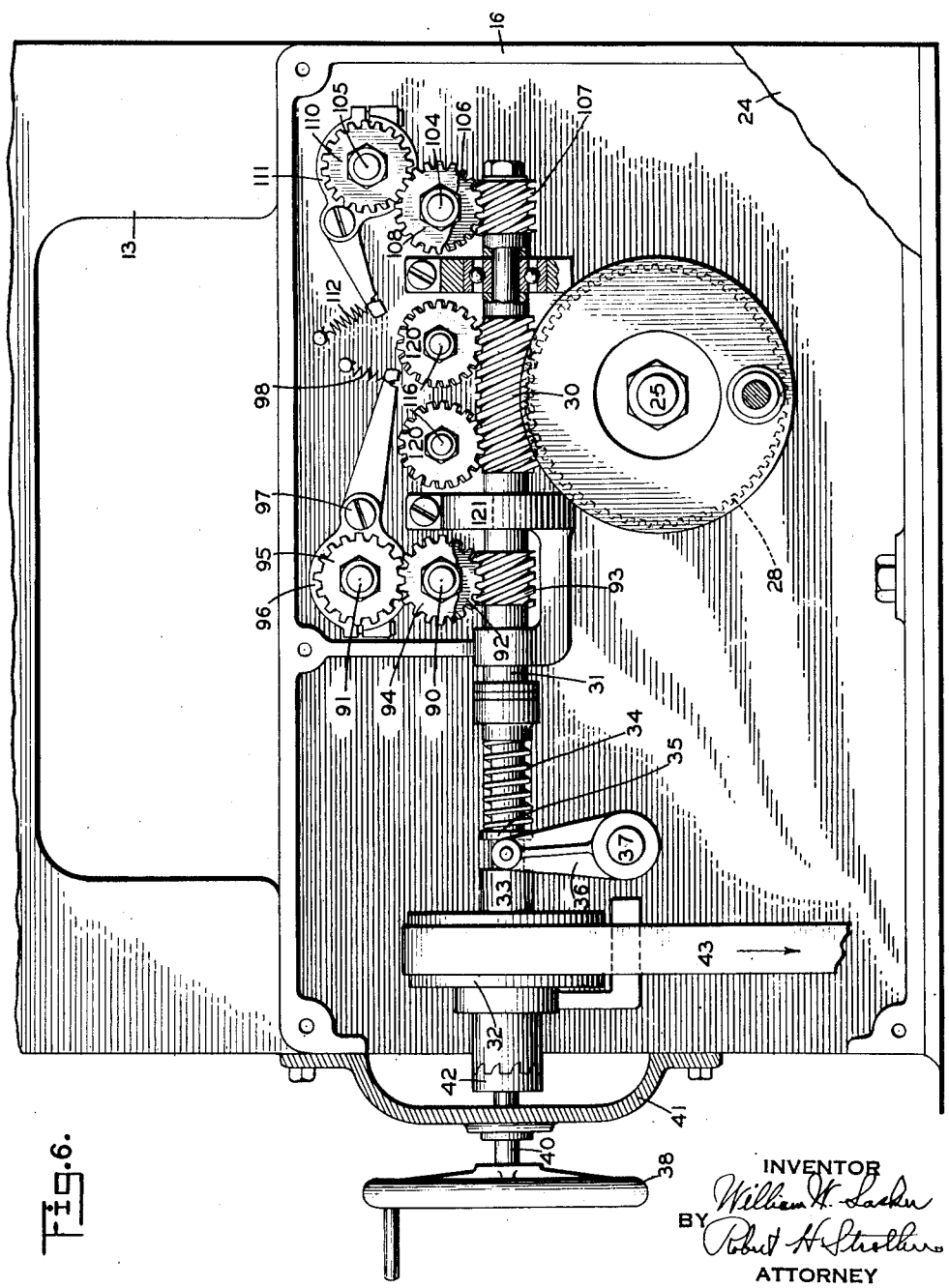

June 16, 1936.  W. W. LASKER  2,044,119
TABULATING MACHINE
Filed May 19, 1931  18 Sheets-Sheet 7
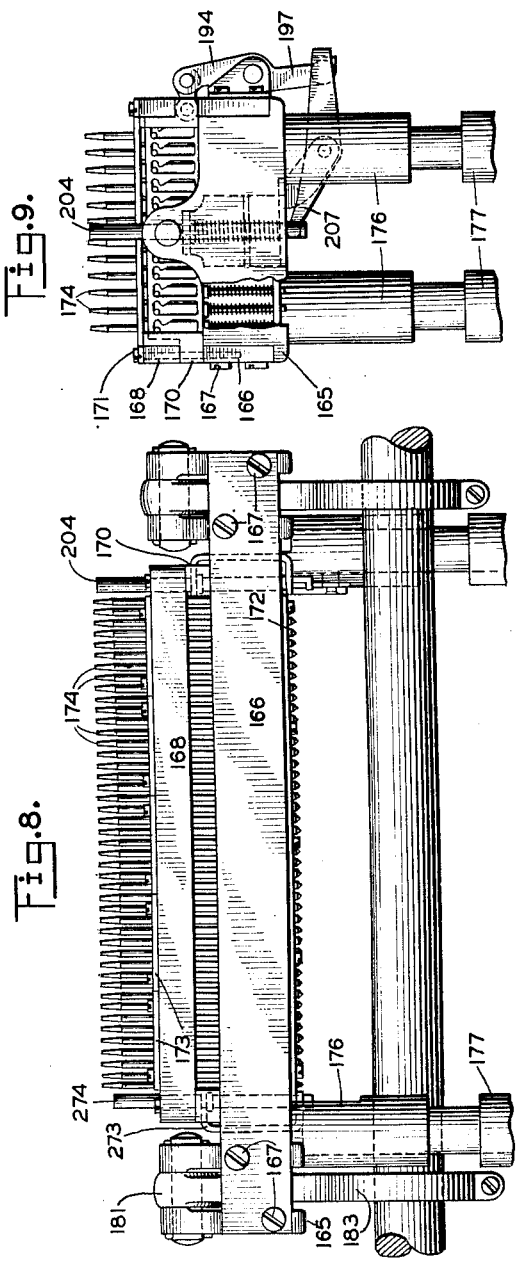
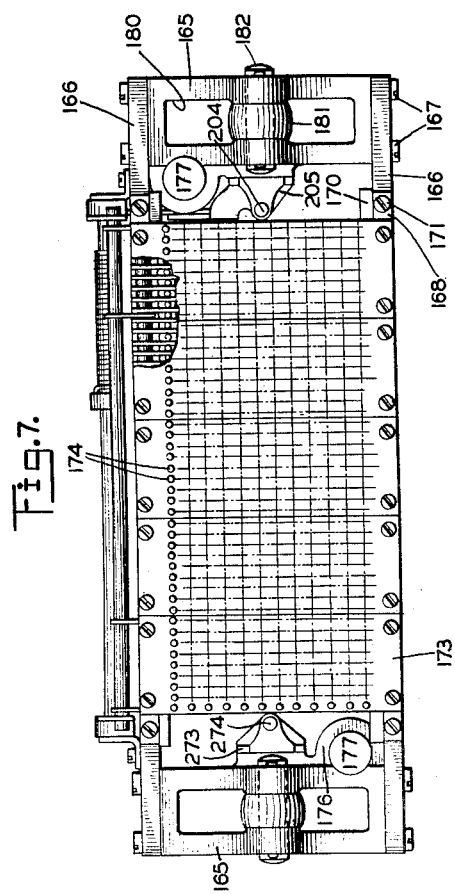
INVENTOR
William W. Lasker
BY
Robert H. Strother
ATTORNEY June 16, 1936.  W. W. LASKER  2,044,119
TABULATING MACHINE
Filed May 19, 1931   18 Sheets-Sheet 8
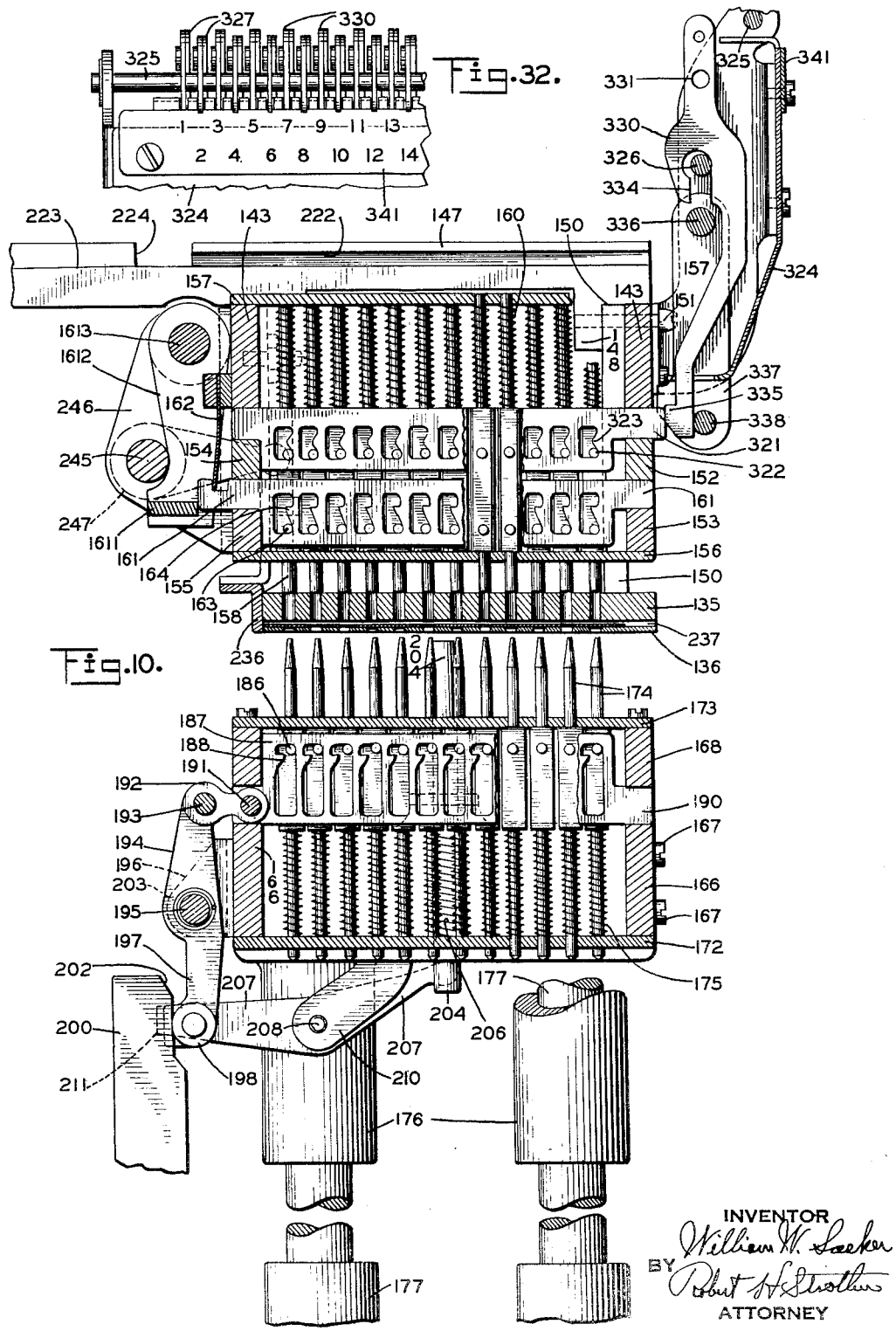

June 16, 1936.  W. W. LASKER  2,044,119
TABULATING MACHINE
Filed May 19, 1931   18 Sheets-Sheet 9

INVENTOR
William W. Lasker
BY Robert H. Strother
ATTORNEY

June 16, 1936.    W. W. LASKER    2,044,119
TABULATING MACHINE
Filed May 19, 1931    18 Sheets-Sheet 10

INVENTOR
William W. Lasker
BY Robert H. Strother
ATTORNEY

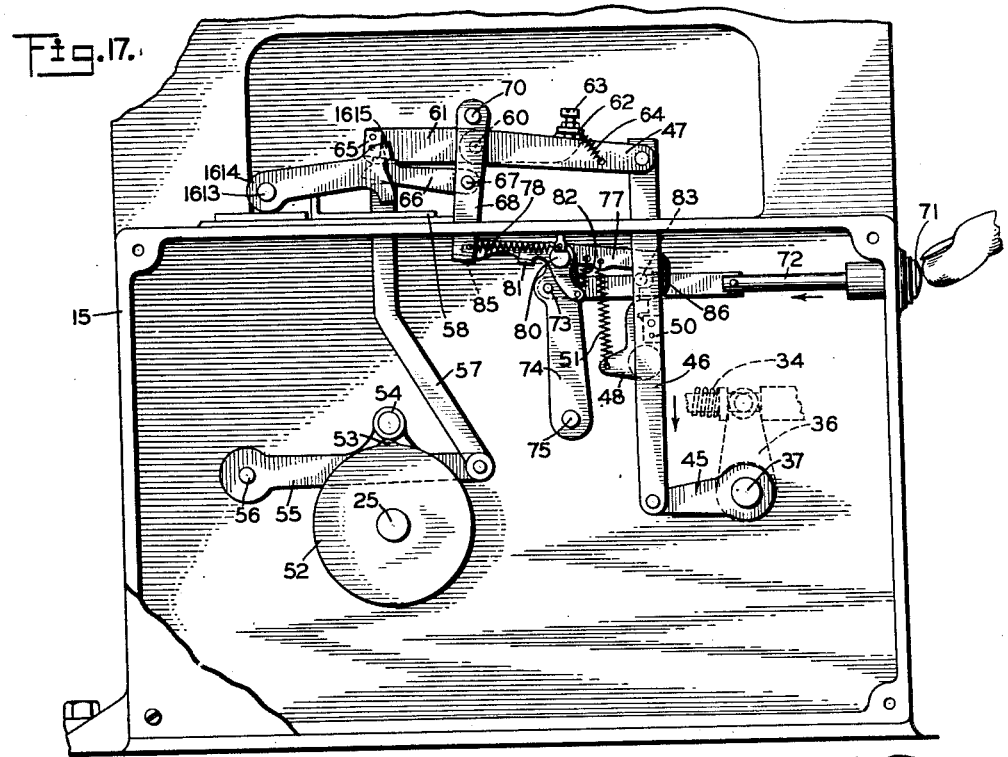
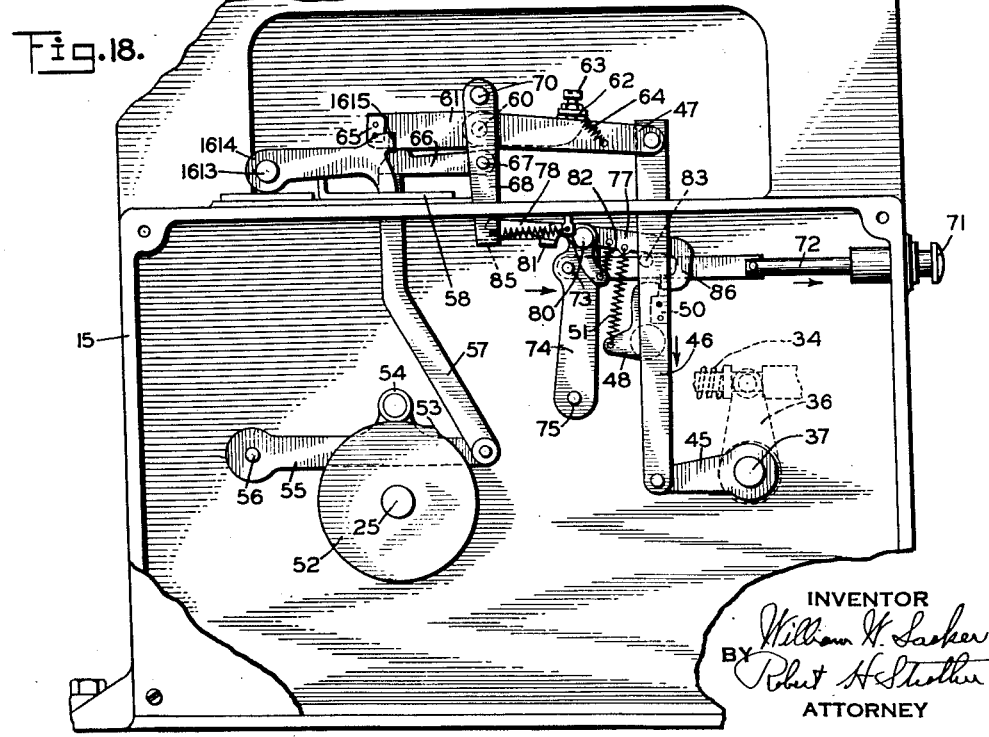

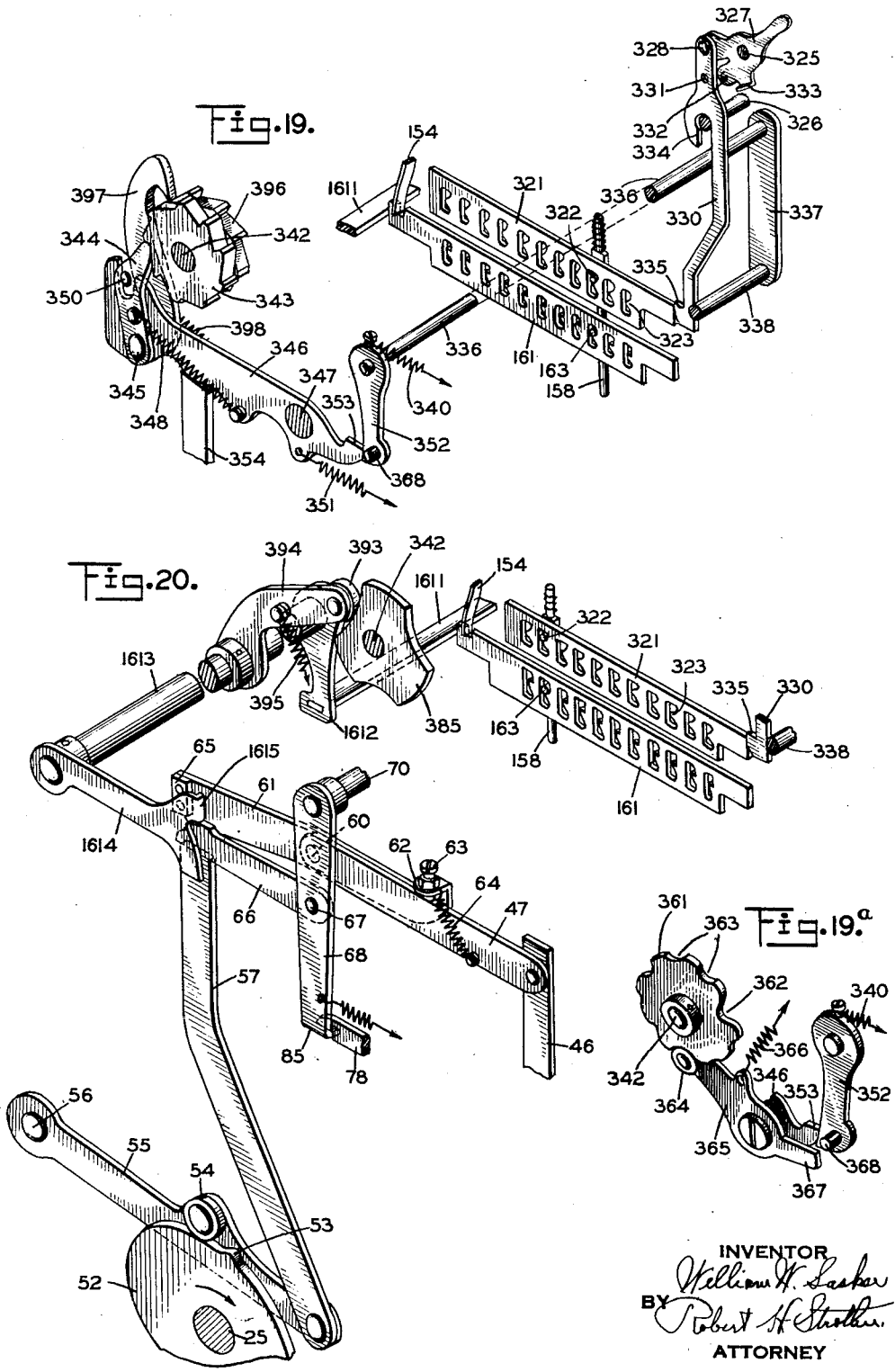

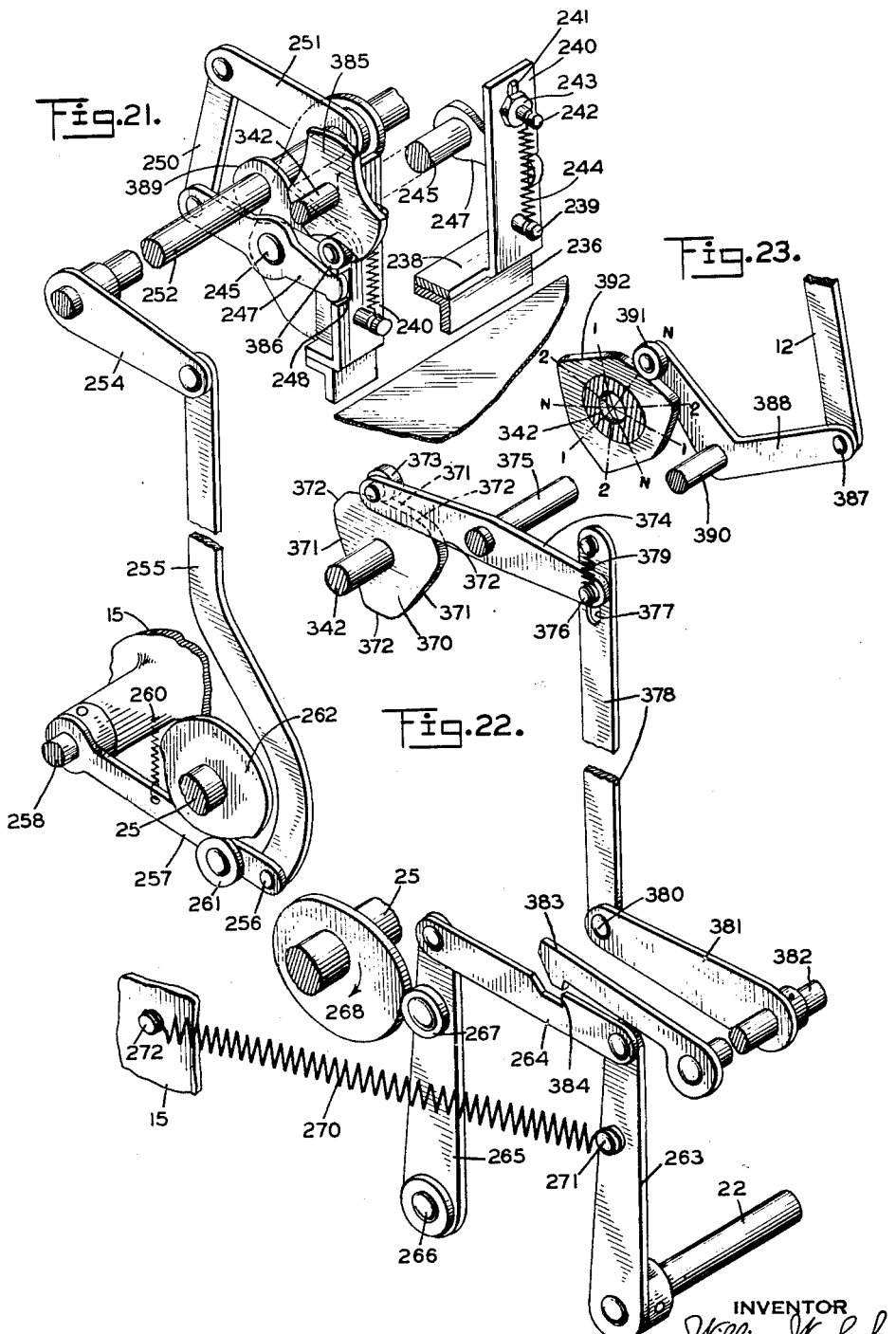

June 16, 1936.  W. W. LASKER  2,044,119
TABULATING MACHINE
Filed May 19, 1931  18 Sheets-Sheet 14

INVENTOR
William W. Lasker
BY
Robert H. Strother
ATTORNEY

June 16, 1936.　　W. W. LASKER　　2,044,119
TABULATING MACHINE
Filed May 19, 1931　　18 Sheets-Sheet 15
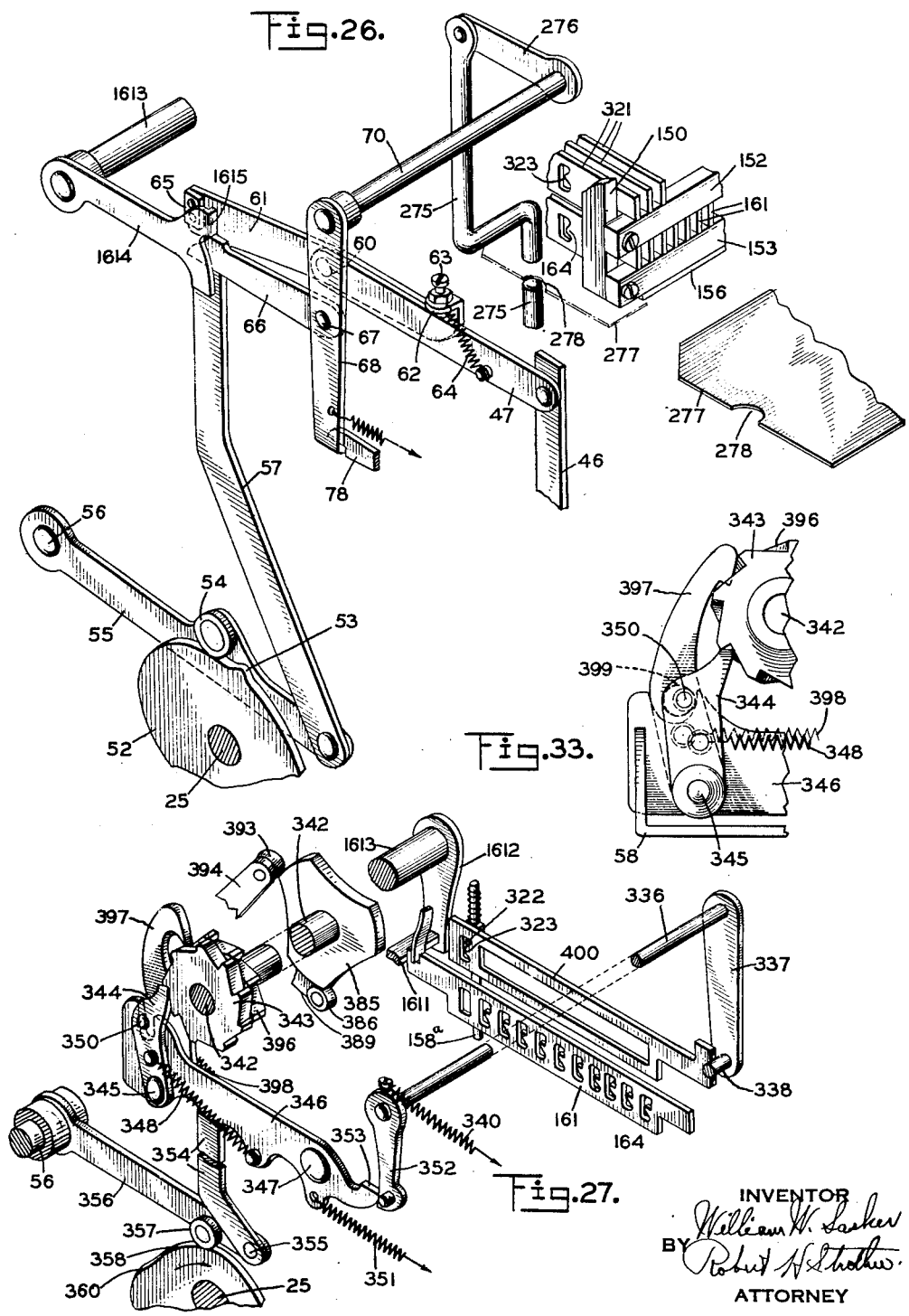

June 16, 1936.    W. W. LASKER    2,044,119
TABULATING MACHINE
Filed May 19, 1931    18 Sheets-Sheet 16
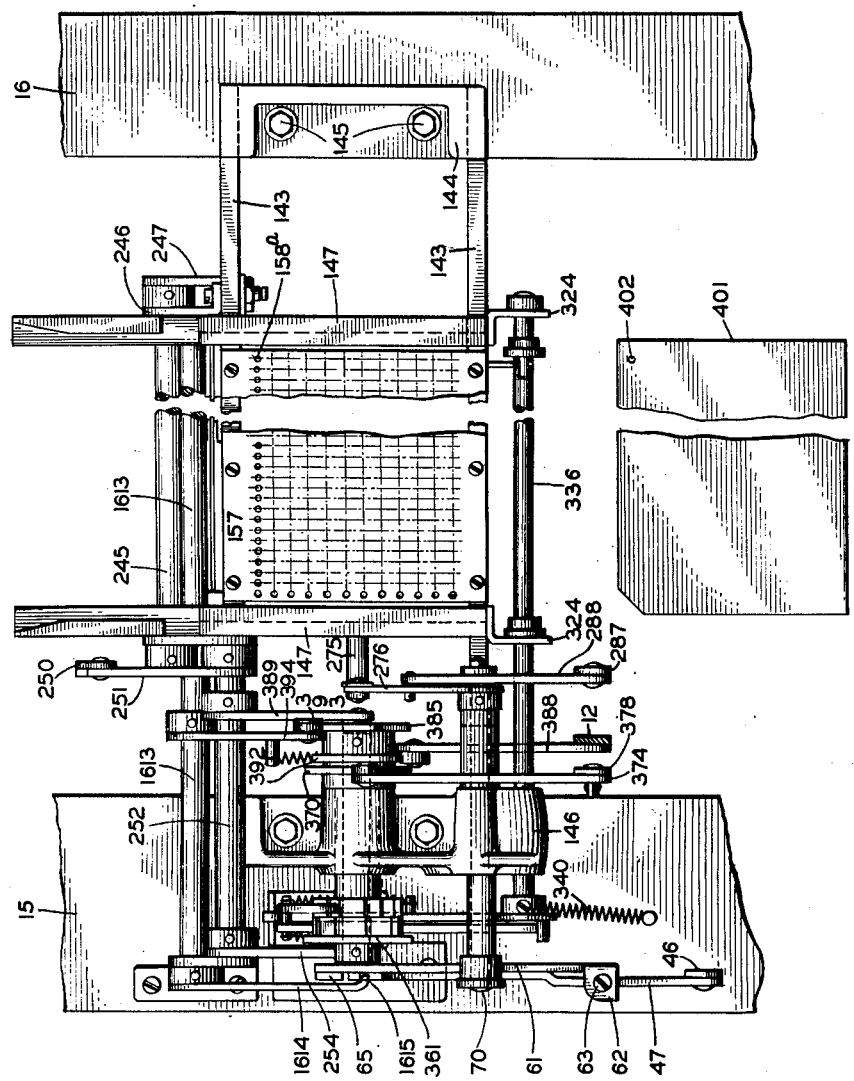

June 16, 1936.  W. W. LASKER  2,044,119
TABULATING MACHINE
Filed May 19, 1931   18 Sheets-Sheet 17
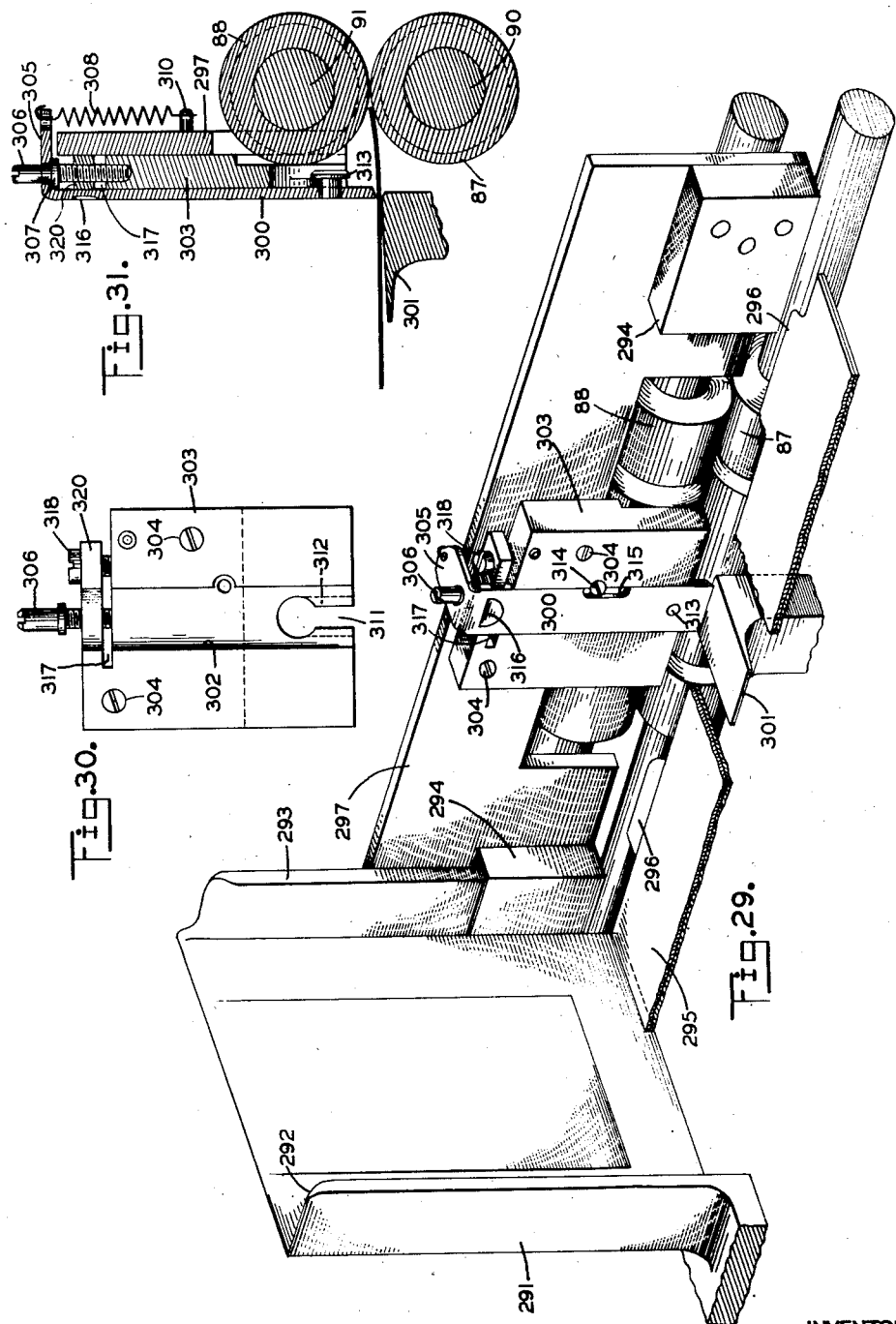

Patented June 16, 1936

2,044,119

UNITED STATES PATENT OFFICE 2,044,119

TABULATING MACHINE

William W. Lasker, Brooklyn, N. Y., assignor to Remington Rand Inc., New York, N. Y., a corporation of Delaware Application May 19, 1931, Serial No. 538,429
In Germany March 21, 1931

28 Claims. (Cl. 235—58)

This invention relates to tabulating machines; that is to say to those statistical and accounting machines which operate on previously punched cards and either print the data indicated on said cards or accumulate such data, or both. In the illustrative instance of the invention shown in the drawings and hereinafter described in detail, said invention is embodied in that portion of a Powers tabulator which is sometimes called the base section of the machine and one of the objects of the invention may be said to be to provide an improved base section for the Powers tabulator. Many of the improvements, however, are of much wider application that that.

One object of the invention is to provide a tabulator that can be successfully operated at a considerably higher speed than has been practicable with the Powers tabulator. Another is to minimize the possibility of delay sometimes experienced with the present forms of tabulating machines owing to slight imperfections in the record cards. Another object is to provide improved and simplified mechanism for automatically recording group totals. This is done in the present machine under the control of the same sensing mechanism that governs the ordinary tabulating operations of the machine. The parts which control the machine when taking totals are positively actuated by the operating mechanism of the machine. Another object is to provide improved means whereby, at will, the machine may be converted so as to permit the use of space and total cards to control the recording of totals wherever such a mode of operation is desirable. Another object is to provide means whereby when the last card has been fed from the magazine a total will not automatically be taken so that if more cards are to be put into the magazine of the same group as before, a split total will not result from the exhaustion of the cards in the magazine. The invention includes means operating in an improved manner for locking the selection registering mechanism and important improvements in operation are associated with this locking mechanism.

Among other things said locking mechanism enables a second card to be fed into sensing position while the upper part or head of the machine is still operating under the control of the preceding card. The mechanism is so designed that the record card does not have to be retained in selecting position as long as formerly which is one of the means by which the speed of the machine has been increased. Another object is to provide for the use of a simple form of stop card. Another is to provide improved starting and stopping mechanism from a single control. Another object is to provide an improved drive mechanism of light running construction.

Further objects of the invention will be made apparent in the course of the specification.

To the above ends the invention consists in certain features of construction and combination and arrangement of parts, all of which will be fully set forth herein, and particularly pointed out in the claims.

One instance of the invention is illustrated in the accompanying drawings in which—

Fig. 6 is a right-hand side elevation of the base section.

Fig. 7 is a plan view of the selecting unit.

Fig. 8 is a front elevation of the selecting unit, showing its main actuating members.

Fig. 9 is an end view of the selecting unit with parts broken away.

Fig. 10 is a front to rear vertical view, sectional and with parts broken, showing the selecting and registering units and associated parts.

Figs. 15–18 are left-hand end views showing different positions of the starting and stopping mechanisms of the machine.

Fig. 19 is a fragmentary perspective view showing the automatic total control members in their positions immediately following a change of designation.

Fig. 19ᵃ is a fragmentary perspective view of certain of said members and some associated parts.

Fig. 20 is a fragmentary perspective view showing the registration releasing members in normal position.

Fig. 21 is a fragmentary perspective view showing the card stop in its open position, together with its controlling mechanism.

Fig. 22 is a fragmentary perspective view showing a portion of the card feed mechanism and certain controlling devices in normal position.

Fig. 23 is a fragmentary perspective view showing the totalling cam in normal position.

Figure 24:
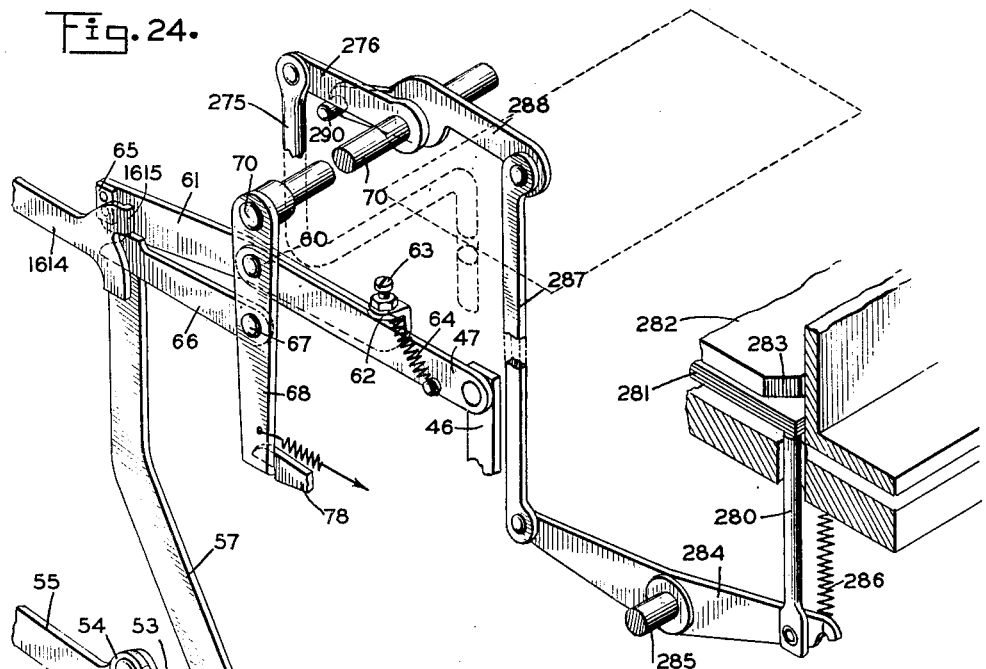

Fig. 24 is a fragmentary perspective view, partly in section, showing the mechanism for preventing split totals on empty feeding magazine, the mechanism being shown in normal position.

Figure 25:
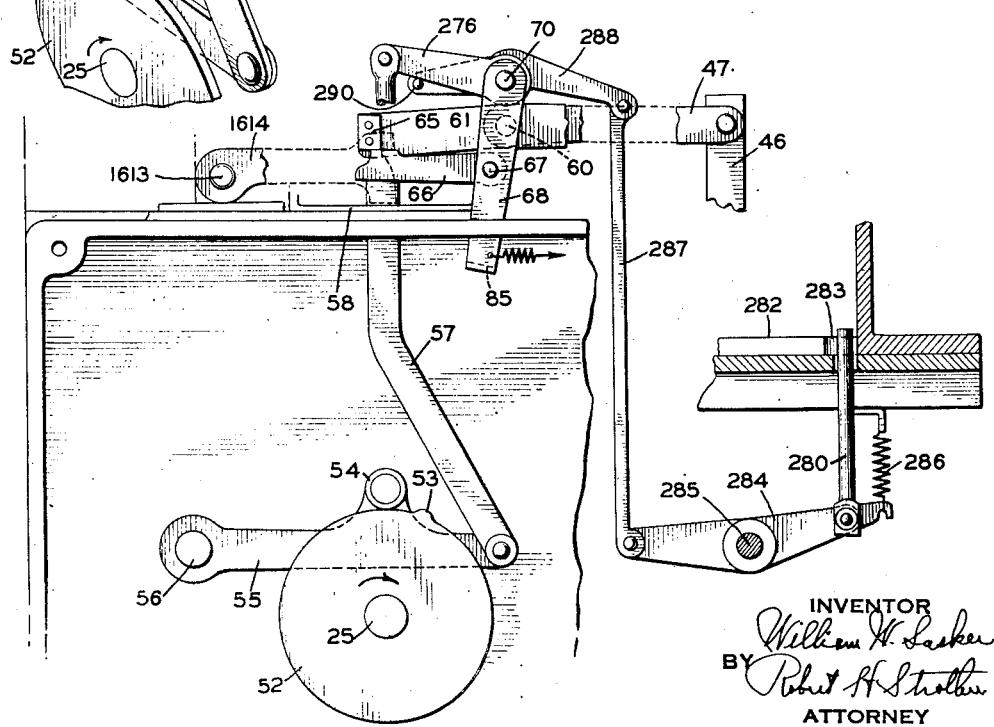

Fig. 25 is a fragmentary side elevation, partly in section, showing in operative position on empty feeding magazine, the mechanism for preventing split totals.

Fig. 26 is a fragmentary perspective view showing the stop sensing mechanism in normal position and a fragmentary perspective of the notched-end stop card.

Fig. 27 is a fragmentary perspective view showing the total card mechanism tripped to initiate the total operation.

Fig. 28 is a fragmentary top plan view showing the total card control mechanism and total card.

Fig. 29 is a partial perspective view of the card magazine.

Fig. 30 is a face view of a portion of the adjustable and releasable card throat device.

Fig. 31 is a front to rear vertical section of the card throat device and the feed rolls.

Fig. 32 (sheet 8) is a fragmentary front view of a portion of the designation sensing mechanism.

Fig. 33 (sheet 15) is a fragmentary side elevation of parts of the automatic total mechanism.

Figure 34:
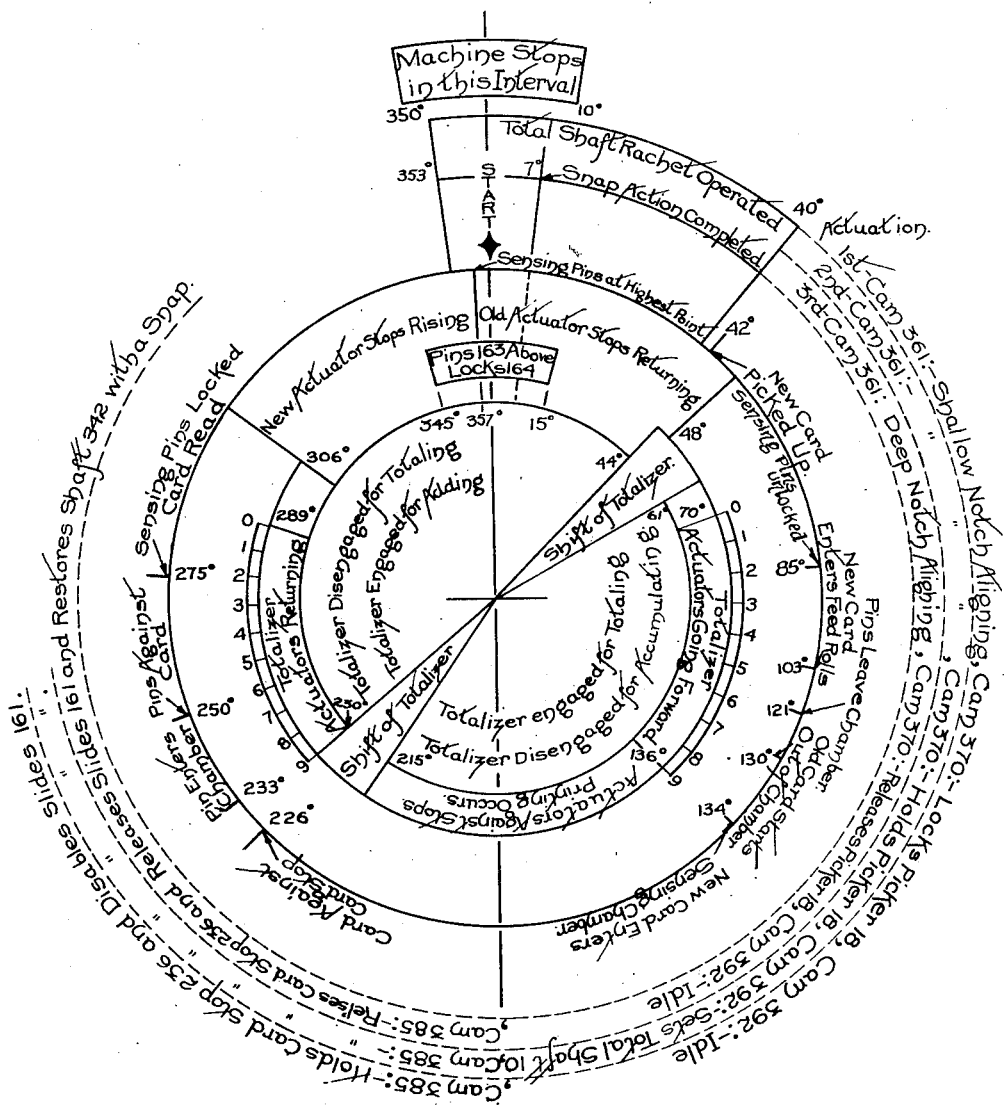

Fig. 34 is a timing diagram of the machine and its automatic totaling mechanism.

Figure 1:
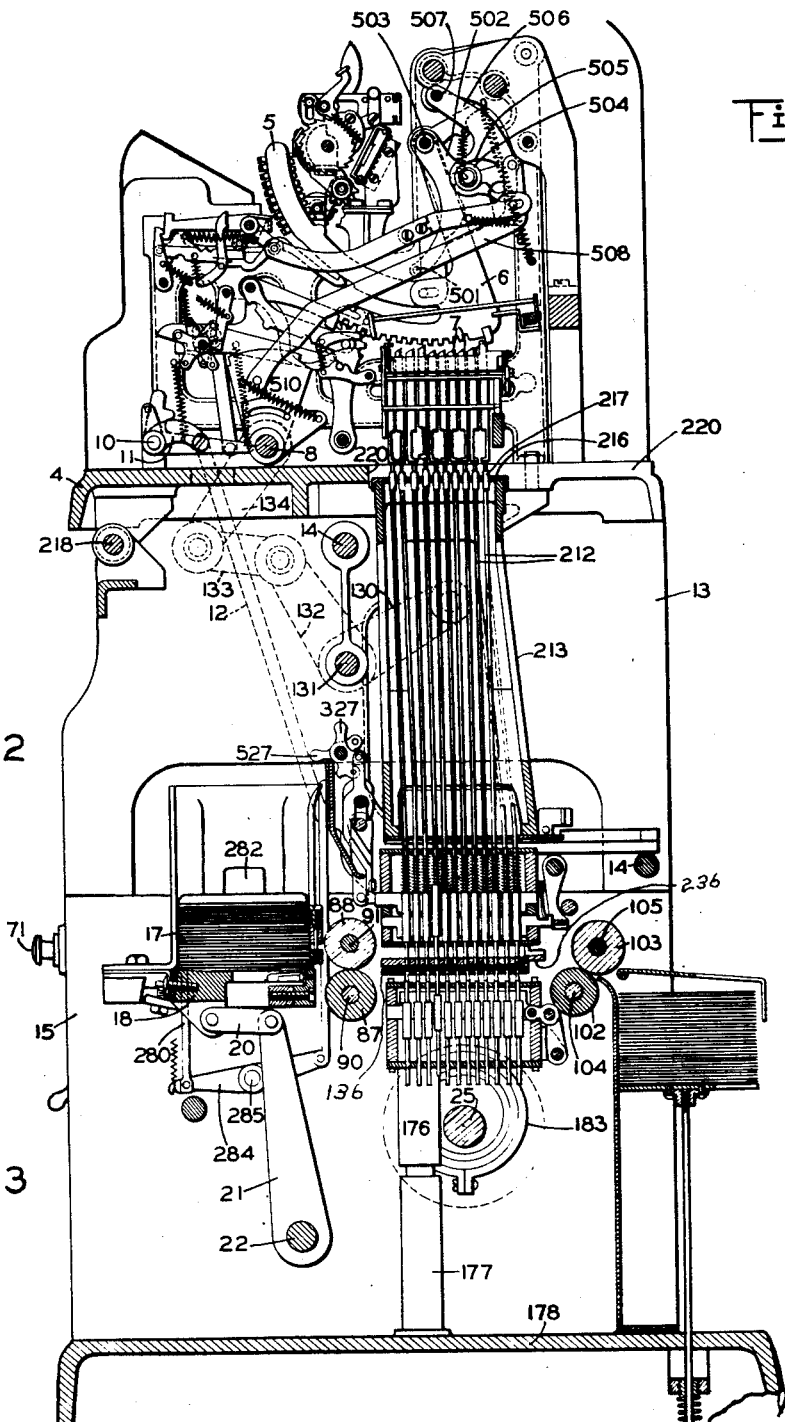
Fig. 1 is a vertical sectional view through the card control and accounting machine showing in side elevation and in initial position parts pertinent to the present invention.

The machine, as a whole, is shown in Fig. 1 as comprising three principal sections, namely, the head 1, the connecting section 2, and the base 3. The frame of the head 1 comprises a base plate 4 and said head is, or may be, of the usual Powers construction, an early form of which is shown in the patents to Powers Nos. 1,245,502 and 1,245,504, but modifications of which are shown in subsequent patents all of which, as well as the commercial machine itself, are well known in the art. The printing mechanism includes the type sectors 5 and the adding mechanism includes the gear sectors 6 which are controlled by the usual stops 7. 8 is the usual main shaft and 10 the usual total shaft having the arm 11 operated to set the machine for total taking by a link 12, all as described in the patent to Lasker No. 1,376,555, dated May 3, 1921.

Figure 2:
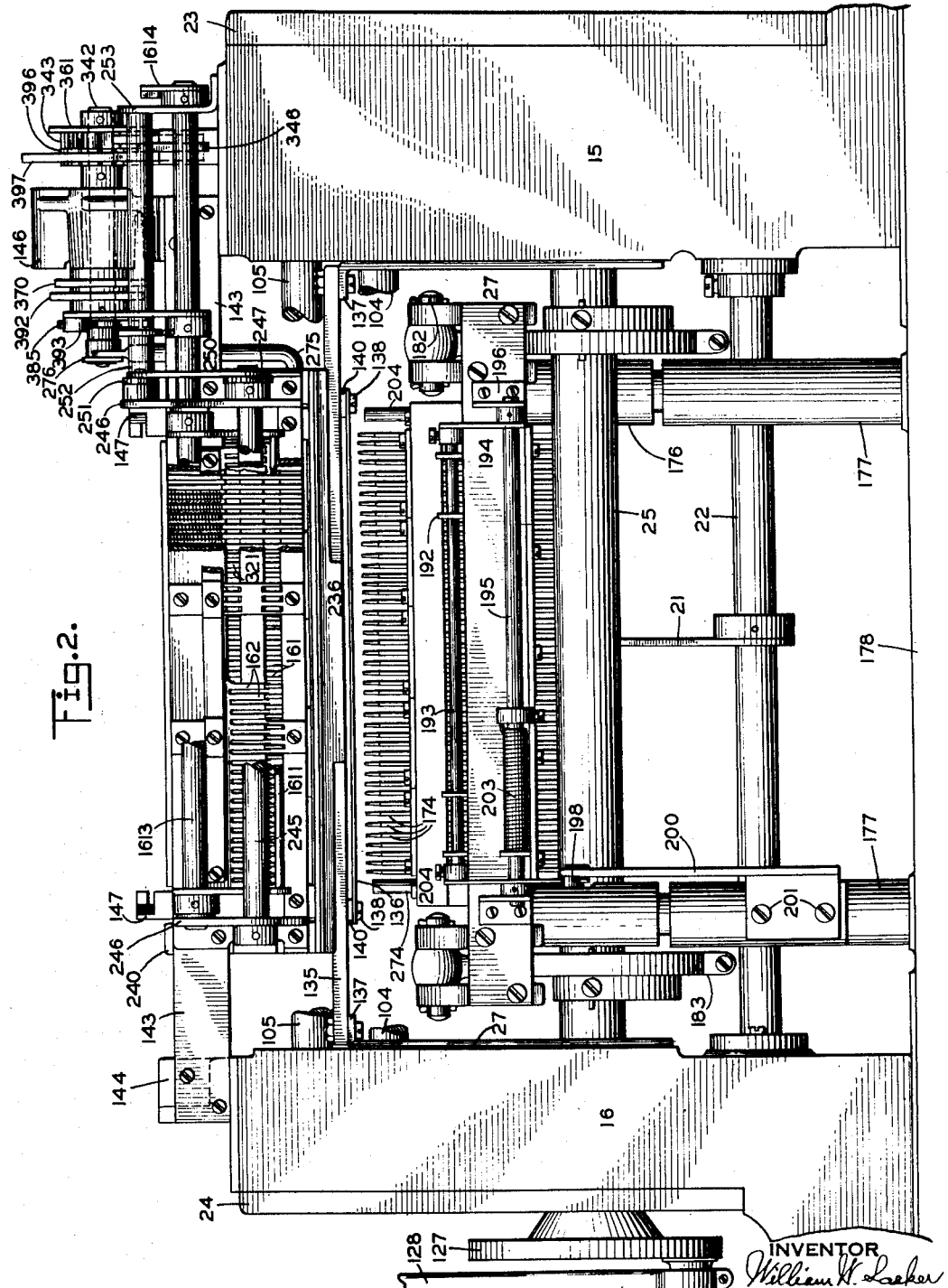
Fig. 2 is a rear elevation partly in section showing the selecting and registering units and some other parts.

The base 4 of the head rests on side brackets 13 which are rigidly connected together by frame rods 14. These brackets 13 rest in turn on two main frame pieces, namely, a left-hand frame member 15 and a right-hand frame member 16 (Fig. 2). The card hopper 17 is at the front of the machine where it is convenient for the operator. It is supported by the frames 15 and 16 and the picker 18 is operated through a link 20 and arm 21 by a rock shaft 22.

Figure 3:
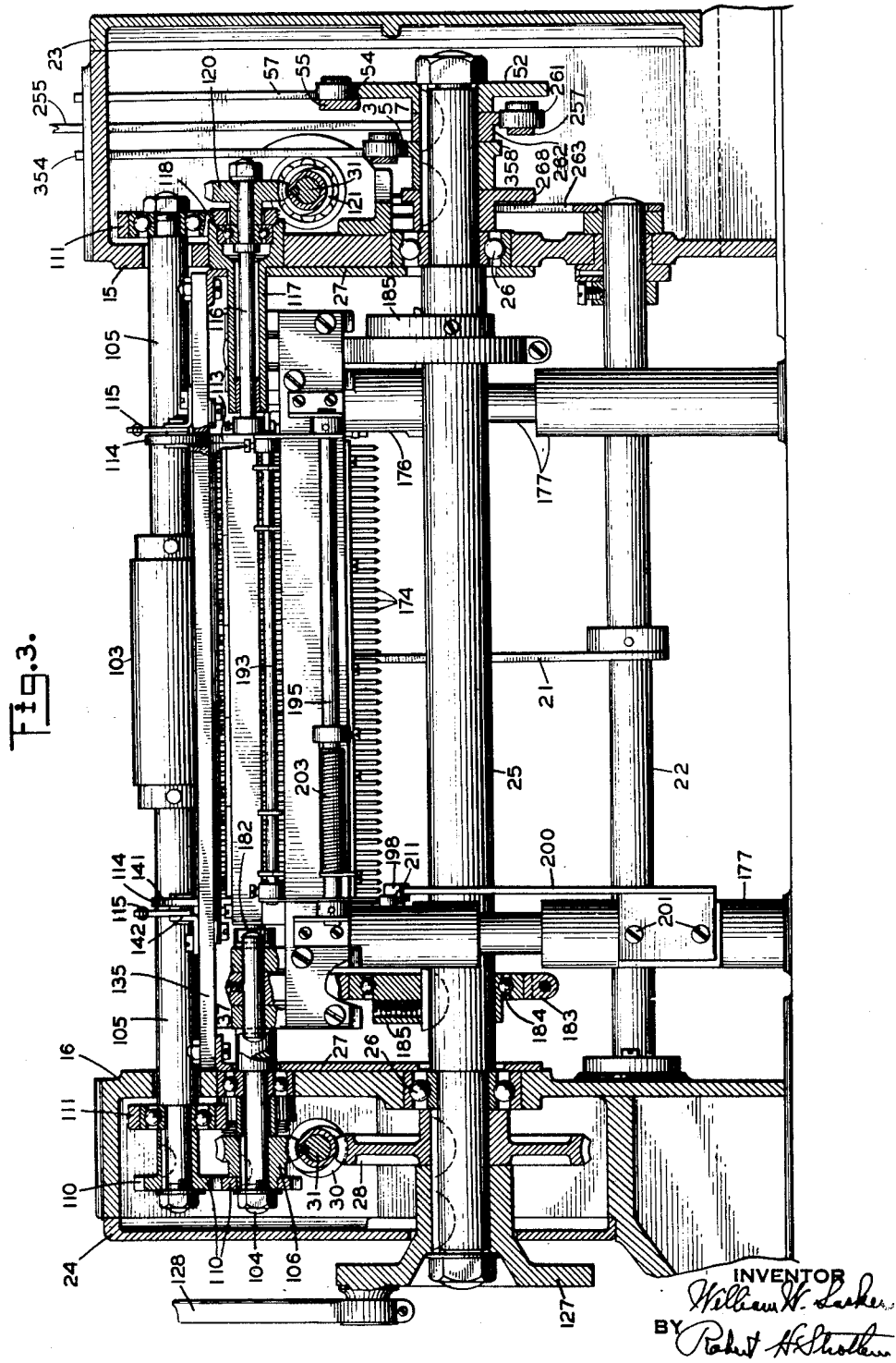
Fig. 3 is a partial rear view, partly in section.

The left-hand frame member 15 is made in the form of a sort of rectangular box, the walls of which are used for the support of the mechanism, but which box is normally closed toward the left by a cover plate 23 (Fig. 3) which cover plate is secured in position by screws. The right-hand frame member 16 is in a somewhat similar form though thinner and it is closed when the machine is in use by a cover plate 24 (Fig. 3). In this way most of the driving mechanism of the machine is covered up and protected when in use, but is readily accessible by removing the cover plates.

The main driving shaft 25 of the machine extends into both frame members 15 and 16 where it is journaled on ball bearings 26 which together with certain other ball bearings are held in place by plates 27 suitably shaped and perforated and screwed to the inner faces of the two frame members 15 and 16.

In order to drive the shaft 25 it has mounted thereon a worm wheel 28 meshing with a worm 30 on a shaft 31 (Figs. 3 and 6) journaled by ball bearings in suitable brackets in the frame member 16 and having loosely mounted thereon a pulley 32 controlled by a clutch 33 which may be of the friction disc type. This clutch is held in its working or closed position by a compression spring 34 acting on a collar 35 of the clutch member, which collar is controlled by a forked arm 36 fastened to a transverse rock shaft 37 and having studs entering a peripheral groove in the collar. The shaft 31 can be turned by a hand wheel 38 whose shaft 40 is slidable in and out in a bracket 41 secured to the frame 16, said shaft having a toothed collar 42 which when the wheel is pushed in engages a toothed hub on the shaft as shown in Fig. 6. When the wheel is pulled out this connection is broken.

Figure 5:
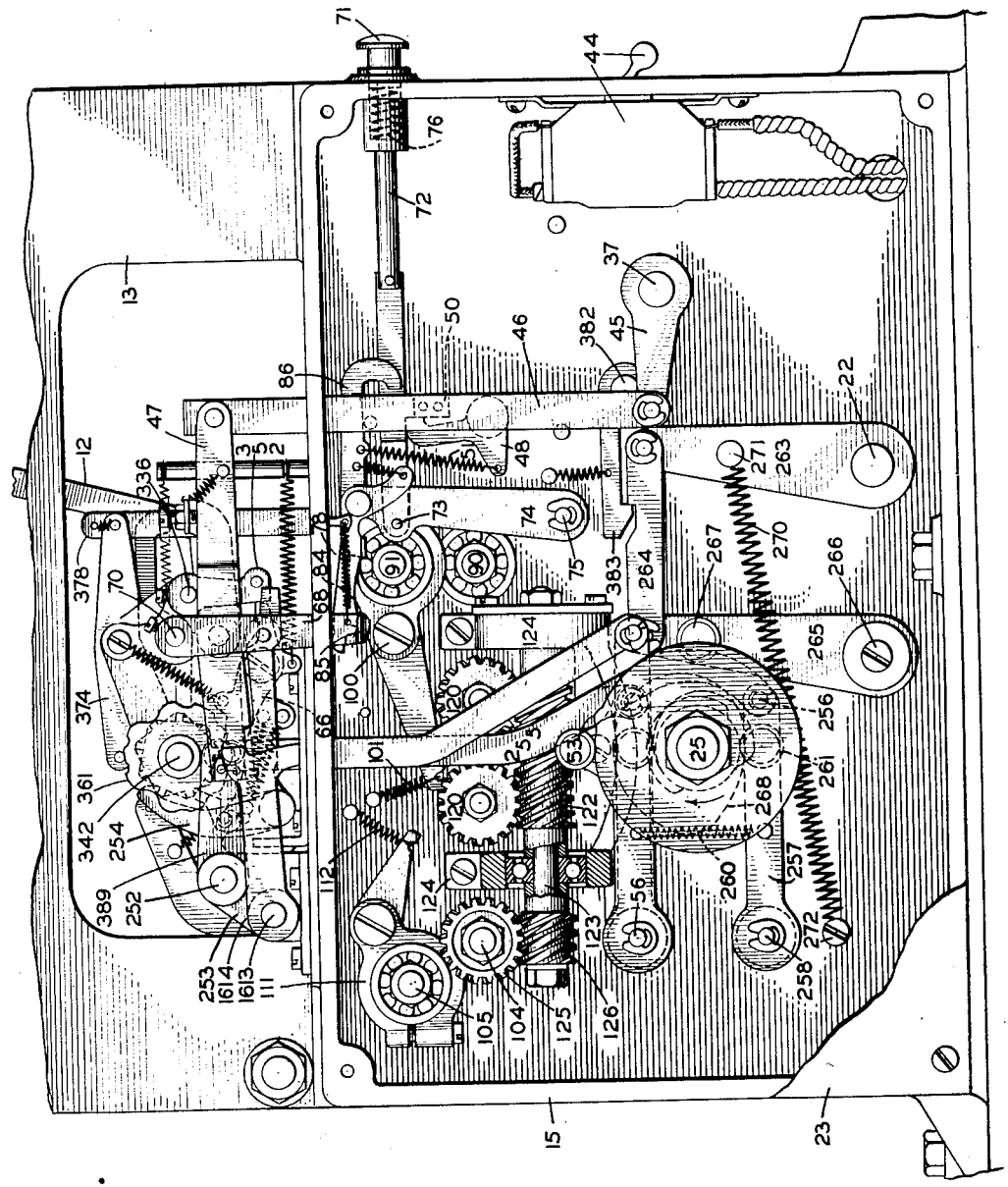
Fig. 5 is a left-hand side elevation of the base section, (card control section) of the machine with part 5 in section.

The pulley 32 is continuously driven by a belt 43 connected to a suitable electric motor in the lower part (not shown) of the machine, which motor is controlled by a switch 44 (Fig. 5).

When the motor is running the machine will be driven as long as the clutch 33 is in action. The shaft 37, which controls this clutch, extends through the machine into the frame box 15 where it has a horizontal arm 45 which is connected by a vertical link 46, with a lever 47 mounted on top of the frame box 15 as shown in Figs. 5 and 15–18. The parts are shown in Fig. 5 in their operating position with the machine running. In order to stop the machine link 46 is forced downward rocking the arm 36 against the tension of the spring 35 and releasing the clutch. When this is done the clutch is locked in disconnect position by a pawl 48 pivoted to the wall of the frame 15 which pawl catches over a lug 50 projecting from the side of the link 46, the pawl being controlled by a spring 51. The parts are shown in disconnect position in Figs. 17 and 18.

It is desirable that the machine always be stopped in the same position, namely, that in which the picker is in its extreme retracted position ready to feed a card into the machine. To this end the clutch is not released directly by hand but is released by a circular cam 52 mounted on the drive shaft 25 and having a projection 53 which operates a follower roller 54 on a lever 55 pivoted at 56 to the frame member 15, and said lever acting when operated to push upward a link 57 which, at its upper end, is guided, together with several other links, in a sheet metal plate 58 secured to the upper surface of the box-like frame member 15.

For purposes of adjustment the lever which operates the link 46 is made in two pieces, both pivoted at 60. The lever 47 is one of these pieces and the other is a lever 61 of the first order having an ear 62 bent over the lever 47 and an adjusting screw 63 bearing on the upper surface of lever 47, the two levers being held in normal relation by a spring 64 which connects them. At its rear end the lever 61 has a lug 65 adapted, on occasion, to be engaged by the end of a link or interponent 66 which is pivoted at 67 to an arm 68, which arm is mounted on a rock shaft 70. The interponent 66 rests on the upper end of the push link 57 and it normally stands as shown in Fig. 18 with its rear end forward of the lugs 65, but by rocking the arm 68 rearward this interponent will be moved under the lug 65. As long as the interponent occupies the position shown in Fig. 16 the machine can go through cycle after cycle without interruption. The interponent 66 will be moved upward once at each rotation, but idly. If by any means the lever 68 be swung rearward bringing the interponent 66 under the lug 65 then when in the rotation of the shaft 25 the projection 53 strikes the roller 54, link 57 will move interponent 66 upward which in turn will rock the lever 61, 47, depress the link 46 and disengage the clutch as shown in Fig. 17, whereupon the pawl 48 will snap over the lug 50 and hold the clutch in its disengaged position.

It will be perceived that anything which swings the arm 68 rearward and holds it there until projection 53 reaches roller 54, will stop the machine. This arm 68 may, therefore, be called the "stop arm" of the machine. Several devices for using it will be described.

One means for stopping the machine consists of a button 71 on the front projecting end of a push rod 72, the rear end of which is pivoted at 73 to an arm 74 pivoted at 75 to the frame piece 15. The button 71 is held in its outer position by a compression spring 76 (Fig. 5) and this button can be used both to start the machine and to stop it.

Figure 15:
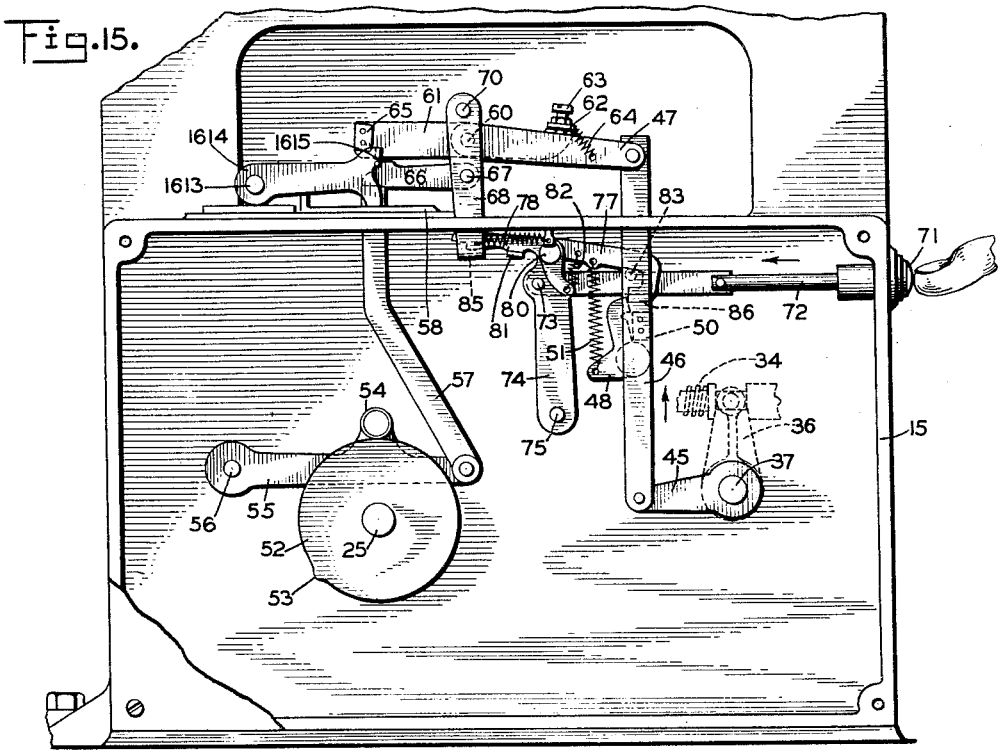

On the upper end of the arm 74 there are pivoted side-by-side two arms 77 and 78 extending respectively forward and rearward from their common pivot 80. The arm 77, at the rear of its pivot, has an ear 81 bent off therefrom on which the arm 78 may rest, as shown in Fig. 15, a spring 82 connecting the two arms, or levers, tending always to maintain the arm 78 pressed against this ear 81. The spring 51 is connected to the lever 77 and tends to pull it down, a motion which is limited by a pin 83 projecting from the side of the link 46.

When the machine is running the parts are in the position shown in Fig. 5 in which a shoulder on the end of the arm 78 engages an ear 85 bent off from the lower end of the stop arm 68. The construction is such that if the button 71 be pushed in it will swing the arm 68 to its effective position, and if the button be held in until the proper time in the cycle, the mechanism above described will stop the machine.

Figure 16:
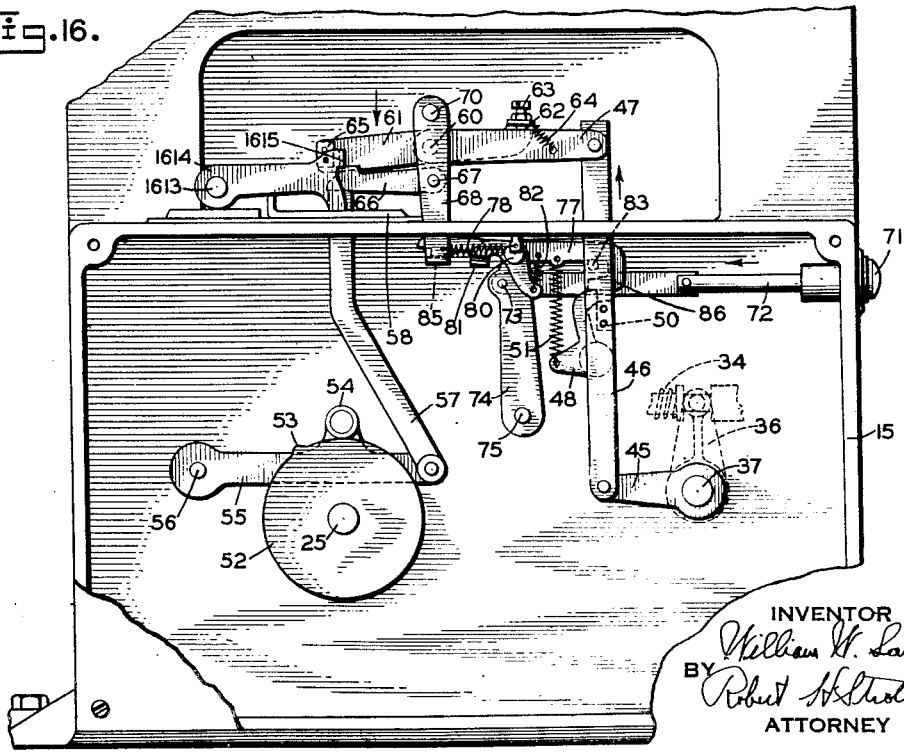

When the machine is stopped the parts under discussion occupy the positions shown in Fig. 18. The arm 77 has been allowed by the movement of pin 83 to drop down at its forward end due to the fact that the link 46 is in its depressed position. This raises the arm 78 so that if the button 71 were to be operated this arm would not operate the stop arm 68. The arm 77 is made at its forward end into the shape of a sort of hook 86 which in the position of the parts in Fig. 18 stands in front of the upper end of the pawl 48. The construction is such that if now the button 71 be pushed in this hook will disengage the pawl 48 and allow the spring 34 to close the clutch and start the machine. This operation is illustrated in Fig. 15, which shows the parts at the instant when pawl 48 is disconnected, and in Fig. 16 which shows the parts an instant later when the spring 34 has moved the link 46 to its upper position. Comparing Figs. 15 and 16 it will be seen that when the button was pushed in the arm 78 was not in a position to operate the arm 68 and when as shown in Fig. 16, the arm 77 is forced up by the pin 83, the arm 78 rests on the ear 85 leaving arm 68 in normal position and forcing lug 81 to move down away from the arm 78 against the tension of spring 82. Fig. 16 shows the parts in position to permit the machine to operate. It will be perceived that it will continue to operate even if the button 71 is held in as shown. Nevertheless if the button be allowed to move outward then arm 78 will snap down to the position shown in Fig. 5 and if then the button be pushed in and held in it will stop the machine.

It may be remarked that the arm 68 is operated to stop the machine by any one of several devices to be hereinafter described such, for example, as a device which is operable in case the cards fail to feed into the sensing mechanism. Comparing Figs. 16 and 17 it will be perceived that even if the button 71 is held in after starting the machine and the cards fail to feed then the special device is still free to swing arm 68 rearward to the position shown in Fig. 17 and stop the machine notwithstanding the starting button is held in. In this case the pawl 48 will snap in under the hook 86 as shown in Fig. 17.

The front feed rolls 87 and 88 (Fig. 1) are driven by the means shown in Fig. 6. These may be steel rolls mounted on transverse shafts 90 and 91 respectively which project into the frame box 16 where the lower shaft 90 has a worm wheel 92 driven by a worm 93 on shaft 31. The shaft 90 also has a pinion 94 meshing with a pinion 95 on shaft 91. The latter shaft is mounted in a ball bearing 96 forming part of a lever which is pivoted at 97 and controlled by a spring 98 which yieldingly presses the upper feed roll 88 against the lower feed roll 87. At their other ends the shafts 90 and 91 project into the frame box 15, the shaft 90 being journaled in a stationary bearing and the shaft 91 in a floating ball bearing pivoted at 100 and controlled by a spring 101. There is but one pair of feed rolls 87, 88, situated immediately behind the magazine 17 and immediately in front of the sensing chamber. The card therefore has but a short path to traverse, which makes for high speed of the machine without the necessity of driving the feed rolls at a high surface speed.

The lower and upper eject rolls 102 and 103 (Fig. 1) are of the usual steel construction and are mounted respectively on transverse shafts 104 and 105 which at their right hand ends project into the frame box 16 where they are driven in the same way as the front pair of rolls, by a worm wheel 106 on shaft 104, worm 107 on shaft 31 and pinions 108 and 110 on shafts 104 and 105 respectively. At each end the shaft 105 is mounted in a floating ball bearing 111 pressed toward the shaft 104 by a spring 112. It will be seen that all four of these rolls will be driven in exact unison and in a definite ratio to the rate of rotation of the drive shaft 25. By this construction they are also driven smoothly and noiselessly, and with little friction.

Inside the sensing chamber each end of a card is engaged by two lower feed rolls 113 which are opposed to two upper feed rolls 114 pressed down by a spring 115. These rolls are arranged in the position usual in these machines and they are therefore shown only in Fig. 3 where it will be seen that the lower feed roll 113 is mounted on the end of a shaft 116 mounted in a tubular housing 117 which is secured in the wall of the frame piece 16, the outer part of the shaft having a ball bearing 118 as shown at the right in Fig. 3. Each of the four shafts 116, (two at each end of the card) has mounted on it a worm wheel 120. At the right side of the machine the two worm wheels 120 engage a worm 30 on shaft 31. At the left-hand end of the machine the two worms 120 (Fig. 5) engage a worm 122 on a short shaft 123 journaled by ball bearings in brackets 124 on the frame piece 15. This shaft 123 is driven by a worm wheel 125 fast on the left-hand end of the shaft 104 and meshing with a worm 126 fast on the shaft 123. The shaft 123 is thus driven from shaft 104 and drives the two right-hand rolls 113.

The main shaft 8 of the head 1 is driven as follows—On the right-hand end of the main drive shaft 25 is a crank disc 127 which operates a pitman 128 (Figs. 2 and 3) which pitman (Fig. 1) operates an arm 130 on a rock shaft 131 journaled in the right-hand one of the brackets 13. This shaft has an arm 132 connected by a link 133 with an arm 134 depending from the shaft 8. The construction is such that the shaft 8 is rocked with a harmonic motion back and forth at each rotation of the shaft 25. The parts 130—134 are indicated in broken lines in Fig. 1 but they do not properly appear in this figure because they are on the right-hand side of the machine which in this figure is sectioned away.

The sensing mechanism includes an upper stationary pin box or registering unit located above the card and a reciprocating pin box or analyzing unit below the card.

The card chamber in which the card is standing when it is analyzed and to which it is fed by the rolls 87 and 88 comprises an upper plate 135 and a lower plate 136 between which the cards are fed, both these plates being, of course, perforated with a full complement of holes for the pins. As best shown in Fig. 2 the plate 135 is supported by flanges 137 bent off from the plates 27 which are secured to the frame pieces 15 and 16. The plate 136 is secured by screws 138 and spacers 140 to the underside of the plate 135. The feed rolls 114 are mounted in the usual fashion on bell cranks 141 pivoted to brackets 142 secured to the upper surface of the plate 135.

Figure 4:
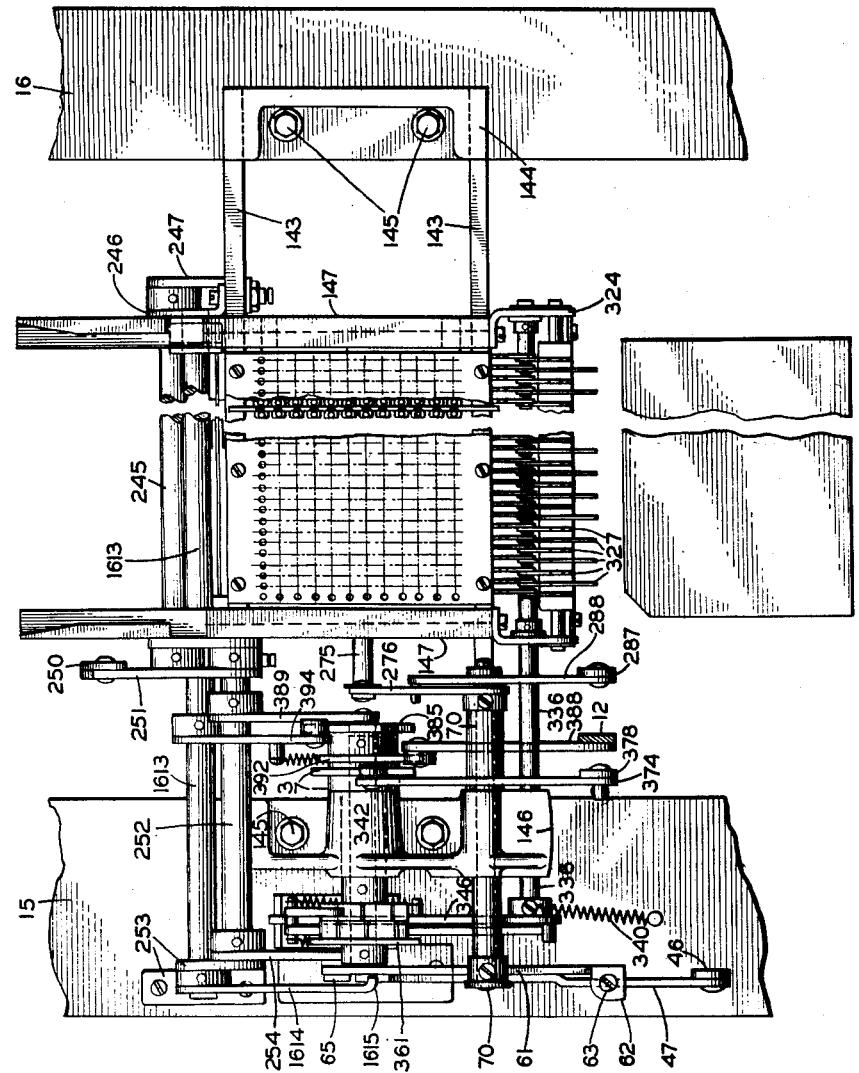
Fig. 4 is a fragmentary plan view of the selecting unit and automatic total control.

As best shown in Figs. 2, 4 and 28 the main frame of the upper or registering pin box comprises two transverse bars 143 which, at their right-hand ends, are secured to a casting 144 secured by screws or bolts 145 to the top of the frame piece 16. At their left-hand ends the bars 143 are similarly secured to a casting 146 similarly secured to the top of the frame piece 15. This casting 146 is also used as a support for some other mechanism as will hereinafter appear. This entire unit of the machine can be removed by removing the four screws or bolts 145 and disconnecting certain parts of the mechanism. The pin box may then be lifted off independently of the card pocket comprising the plates 135 and 136.

The two bars 143 are connected by two rail members, or bars 147, the construction being as shown in the upper part of Fig. 10. Just inside of each of the bars 143 each rail 147 has a depending lug 148 between which and the bar 143 is a vertical frame post 150 which hangs down below the bar 143. The whole is secured together by a screw 151. This construction is duplicated at all four corners of the pin box.

The posts 150 support, at the front side of the pin box, two transverse bars 152 and 153 and at the rear two similar bars 154 and 155. The lower bars 153 and 155 support a series of perforated plates 156 and a single perforated plate 157 is secured by screws to the upper edges of bars 143.

The pins 158 are reduced in their upper and lower parts for passage through the holes in the plates 156 and 157 and the middle parts of said pins are large and have flat faces. Compression springs 160 normally hold these pins in their lower positions as shown in Fig. 10.

Between each two consecutive rows of pins a sliding latch plate 161 is mounted and guided by the frame bars 152 and 153, and 154 and 155. A flat spring plate 162 is made with a series of fingers, each extending into a notch in a latch plate 161 and tending to draw said plates toward the front of the machine. Each of the pins 158 has a small stud 163 lying in a vertical slot in the plate 161 and cooperating with a latch shoulder in said plate, these plates being made in the form of grids as shown. The construction is such that whenever one of the pins is pushed to its upper position it will be automatically latched there and all the pins can be released by pushing the slides 161 to the right in Fig. 10 against the pressure of their springs 162.

It will be understood that the latch plates 161 are guided against up and down motion by the frame bars described and that they are guided against motion right and left of the machine by the rows of pins between which they are situated. See Fig. 26.

Just at the close of a cycle of the machine all of the latch bars 161 are released. To this end a bail bar 1611 (Fig. 20) is mounted on arms 1612 rigid on a rock shaft 1613 having on its end an arm 1614, an ear 1615 of which lies over the upper edge of the bar 66. This bar is moved upward momentarily at the end of each rotation of the drive shaft 25 and the ear 1615 is so situated that it lies on top of the bar 66 in either of the two positions of said bar.

The analyzing unit consists essentially of a pin box which is reciprocated up and down once in each cycle of the machine. The construction of this unit can be best understood by reference to Figures 1, 2, 3, 7, 8, 9 and 10. It comprises two end castings 165 connected together by two frame bars 166 secured thereto by screws 167. As best shown in Figs. 8 and 9 a frame bar 168 is secured above each bar 166 by means including a spacer 170 and a long screw 171 which passes down through the bar 168 and through the spacer and is screwed into the bar 166. The effect, as seen from the front and rear, is a frame bar having a long slot between the bars 166 and 168.

A lower perforated plate 172 is secured by screws to the under edges of bars 166 and upper perforated plates 173 are secured by screws to the upper edges of the bars 168, and the feeler pins 174 are mounted in the perforations in these two plates.

As best shown in Fig. 10 each of the pins 174 comprises reduced upper and lower ends which pass through the upper and lower plates between which they have enlarged flat faced portions. They are pressed upward by light compression springs 175.

Each of the castings 165 has integral therewith a depending tube 176 having a round hole in which is the reduced upper end of a post 177, these two posts being rigidly mounted in the base casting 178 to which the frame pieces 15 and 16 are secured. The construction is such that the entire selecting unit is accurately guided for up and down motion on these posts 177. As shown in Fig. 1 the main drive shaft 25 is directly beneath the middle of the selecting unit and one of the posts 177 stands in front of the shaft and the other behind it. The construction is such that the two castings 165 are identical in construction, the right-hand one being turned end for end with respect to the left one. Each of the castings 165 is made with an opening 180 in which a pitman 181 is situated, each pitman being pivoted to the casting on a pin 182. These pitmen are the upper ends of eccentric straps 183 (Figs. 1 and 3) mounted by ball bearings 184 on eccentrics 185 secured to the main drive shaft 25. The construction is such that the selecting unit is moved up and down with a harmonic motion. The terms harmonic motion or harmonic reciprocation are used herein to distinguish from the erratic motions derived from irregular cams or the like.

In order that these pins may act positively and not merely by the power of the springs 175, means are provided for locking whichever pin finds a perforation in the card. To this end the flat enlarged portion of each pin 174 has a stud 186 projecting therefrom into a grid-shaped latch plate 187 each upright cross bar of which has a latch tooth 188. There is one of these latch plates between each two consecutive rows of pins. Said plates have ears 190 projecting into the space between the frame bars 166 and 168 to guide the plates against up and down motion. They are guided against right and left motion by the rows of pins. Each of these plates is perforated at its rear end and a rod 191 extends through the perforations, this rod being connected by several links 192 to a bail rod 193 which is mounted on arms 194 fast on a rock shaft 195, mounted in brackets 196, secured to the rear bar 166.

The construction is such that by rocking the shaft 195 all of the latch plates 187 can be moved in unison toward the front or back of the machine. To this end one of the arms 194 has a downward extension 197 carrying a follower roll 198 which acts on a stationary cam plate 200 which (Figs. 2 and 3) is secured by screws 201 to one of the posts 177. The front edge of this cam bar 200 has a vertical portion on which the roll 198 rides when the selecting unit is in its lower position as shown in Fig. 10. This cam bar also has an incline 202 which allows the roll to move toward the rear of the machine and the bar 191 toward the front of the machine to move all the latch plates to locking position. This motion is effected by a spring 203 (Fig. 3) coiled about the shaft 195. The whole construction is such that when the selecting unit is in its lower position the pins 174 are all unlocked. When they are moved up only a short distance ordinarily all but one of the pins in any given row are arrested by the card but that one pin finds a perforation and continues its upward motion. After this upward motion has continued a short distance the roll 198 running on the incline 202 will permit the spring 203 to move the latch lugs 188 under the studs 186 of the active pins and to move the other latch lugs 188 in above the studs 186 of these pins that have been arrested. This will occur just before the upper end of the projected pin strikes the lower end of the pin 158 of the registration unit so that the raising of this pin and of the mechanism above it is effected positively through the latch plate 187. The upper ends of the feeler pins 174 are tapered as shown so that they will enter the holes in the card even though the latter may not be accurately positioned in the chamber; and the pins being forced up positively will tend to move the card to its correct position, and they will be fully operated notwithstanding some frictional resistance by a slightly misplaced card.

In order to prevent mutilation of the cards by the tapered upper ends of such pins 174 as may not be entered in holes in the cards, the compression springs 175 are made inferior in strength to springs 160 of pins 158. This difference in strength is carefully determined with the result that those pins 174 which are momentarily not in service are held down by the action of springs 160 working through pins 158 and the card.

If provision to the contrary were not made, when there was no card in the analyzing mechanism, all of the pins 174 would move upward and be locked by the latch plates 187. In order to prevent this a special feeler pin is provided, this pin being mounted in a sheet metal bracket 205 on the right-hand casting 165, the position of the pin being such that when the unit is raised the pin will be arrested by the end of the card beyond the last row of holes, in case there is any card in the machine, but it will continue to move upward under the pressure of a light spring 206 (Fig. 10) in case no card is in place. At its lower end the pin 206 is articulated with a lever 207 pivoted at 208 to a bracket 210 secured to the casting 165. This lever extends alongside the lower end of the lower arm 197 where the former has an ear 211 bent off beyond the lower end of arm 197 as shown in Fig. 10. It will be perceived that if no card is in the chamber, when the unit moves upward this lever 210 will remain in the position shown and the ear 211 will prevent the shaft 195 from rocking and will, therefore, prevent any of the pins 174 from being locked in the projected position. The result will be that when the upper ends of the pins 174 strike the lower ends of the pins 158 they will be unable to overcome the resistatnce above them and none of the pins 174 will move any further and none of the pins 158 will move upward. When, however, a card is in place in the machine the pin 204 will be arrested by the card and the pivot point 208 of lever 207 will move upward and the lever will therefore swing about its pivot 208 and move the ear 211 up to a position where it cannot arrest the lever arm 197.

In order to convey the motion of the pins 158 of the registration unit up to the stop 7 of the head of the machine the usual wires 212 (Fig. 1) are employed mounted in a readily detachable connection box, or multiple translator. This unit has some novel features and its construction is best shown in Figs. 1 and 11–14.

Figure 11:
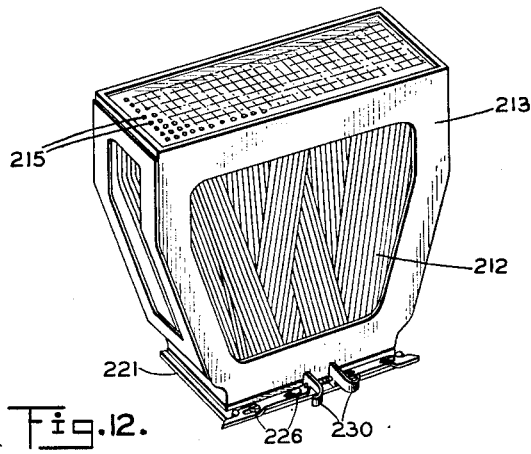
Fig. 11 is a perspective view of the detachable multiple translator unit.
Figure 12:
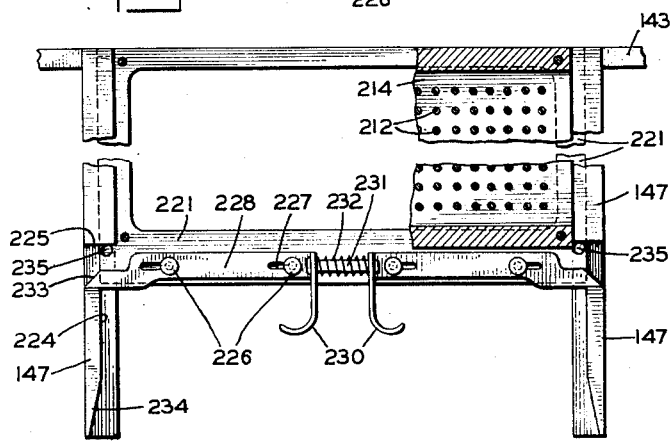
Fig. 12 is a fragmentary plan view, partly in section, showing the positive retaining device for the unit shown in Fig. 11.
Figure 13:
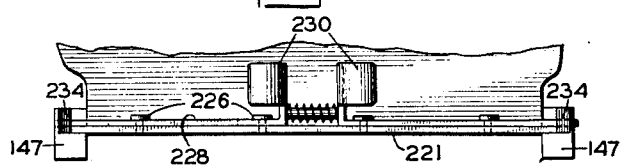
Fig. 13 is a fragmentary front view of the same.
Figure 14:
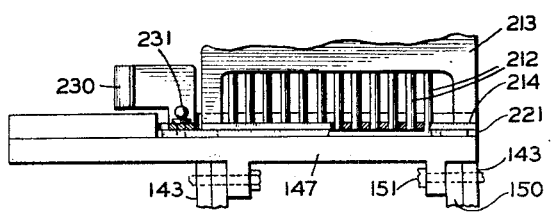
Fig. 14 is an end view of the same, partly in section.

This unit comprises a frame 213 which may conveniently consist of a single aluminum casting defining the skeleton outline of a sort of hexagonal box. A perforated plate 214 is secured by screws to the underside of this box, or frame, to guide the lower ends of the wires 212. The upper part of the unit is conventionally shown in Fig. 11 provided with a series of holes or perforations 215 for the upper ends of the wires. In practice, however, the wires are guided at their upper ends by the usual narrow strips 216 (Fig.

1) each strip having twelve rectangular notches cut in one of its edges to receive its flattened portions 217 of the wires. Where these wires are flattened as shown it makes them broader in a front to back direction but thinner in a right to left direction. This flattened portion prevents rotation of the wires and also furnishes shoulders which limit the vertical movement of the wires. This construction being well known is not illustrated in detail.

As this unit has heretofore been made it was necessary, as described in Patent #1,245,504, to tilt the rear part of the head portion 1 of the machine upward about a pivot rod 218, insert the connection box and then drop the head back into place. By the present improvements this operation is simplified. The head may be secured permanently in place on the upright brackets 13 and the multiple translator can be simply pushed from the back of the machine into its operating position where it will be automatically locked. To this end the base 4 of the head is made with a suitable cut-out as indicated at 220 so as to enable the upper part of the translator to be simply pushed into place.

At its base the frame casting 213 has secured thereto, beneath the perforated plate 214, an additional plate 221 (Fig. 12), which is in the form of a hollow rectangle and the dimensions of which are slightly greater than those of plate 214. Plate 221 is so located, with respect to plate 214, that it projects beyond the frame at both sides and in front. The side projections are utilized as flanges to aid in positioning the connecting box; the front projection provides space on which to mount latching means hereinafter described.

The rails 147, heretofore referred to, project some little distance rearward from the registration unit to which they are secured and are provided with longitudinal horizontal grooves 222 (Figs. 10 and 12) into which the projecting edges of flanges of plate 221 may be placed. The upper portion of the grooves is cut away for a short distance at the extreme rear of the rails leaving L shaped pieces formed from the bottoms of the grooves and projecting ribs 224. This construction makes it very easy to insert a connecting box, since the flanges of plate 221 are merely set on the groove bottom and the box pushed back, guided by the ribs 224. A notch 225 is cut across each rib 224 providing shoulders used for latching purposes.

In order to latch the device in place the forwardly projecting part of the plate 221 is provided with headed studs 226 projecting through slots 227 in sliding latch bars 228, each of which is bent off at its inner end to form a handle, or finger piece 230. A pin 231 is riveted into one of these finger pieces and passes through a hole in the other and a compression spring 232 surrounding said pin pushes the two latches out into operative position. When the unit is in its operating position in the machine the ends of these latches engage the rear ends of the notches 225. In other words they engage the ends of the flanges 224 and positively hold the box in position. The box can be removed at any time by pinching together the two finger pieces 230 and pulling the box toward the rear. In order to facilitate the action of the latches 227 each of them has on its end a bevel 233 adapted to cooperate with a bevel 234 on the forward end of flange 224. The cooperation of these bevels is such that when the box is set down on the rails in the manner above described and simply pushed toward the front of the machine the latches are automatically forced inward and snap out into locking position when the box reaches its proper position.

In order to limit the inward motion of the connection box, two stop pins 235 project upward from the plate 221 in position to be arrested by the upper portion of the groove 222. The base of the box is thus held rigidly front and back by the latches 228 and pins 225, it is held right and left by the rails 147 and it is held up and down by the flange or plate 221 and the groove 222. This construction greatly facilitates the changing of these units which is a thing that has to be done by the operator of the machine.

It will, of course, be understood that the wires 212 can be arranged in a great variety of ways so as to transmit data punched in certain fields of the card to any desired stops, and also if desired to other special devices.

In this machine, as in others, the card is held in the sensing chamber during the sensing operation by means of a card stop. This stop consists of a bar 236 of sheet metal mounted in the registration unit and slidable downward so as to close the passage 237, Fig. 10, into which the card is fed. As best shown in Fig. 21, this stop consists of an angle bar whose vertical flange comes down to close the card passage as shown in Fig. 10 and whose horizontal flange is secured to a cross bar 238 of sheet metal which at its ends is bent upward to form two slides 240, Fig. 21. These slides come up just inside of the front frame bars 143, 154 and 155, projecting below the latter as shown in Fig. 10. Each of them has a vertical slot 241 through which passes a guide stud 242 held in place by a nut or head 243. A spring 244 connects the stud 242 with a stud 239 projecting from the slide 240, the tension of the spring tending to hold the card stop up in inactive position. The position of these devices can be understood from Fig. 2 where it will be seen that the slide 240 comes up just outside the rail 147.

In order to move the card stop down and up at the proper times a rock shaft 245 is provided, Figs. 2, 4, 10 and 21, said shaft being journaled in brackets 246 secured to the rear faces of the bars 143 and 155, and having at each end an arm 247 extending forward into notches 248 in the slides 240. One of the arms 247 is prolonged rearward and is connected by a link 250 with an arm 251 fast on a transverse rock shaft 252 which shaft is journaled at one end in one of the brackets 246 and at the other end in a bracket 253 secured to the top of the frame piece 15.

At its left-hand end the shaft 252 has an arm 254 extending toward the front of the machine where it is pivoted to the upper end of a link 255, Figs. 5 and 21, which extends down in front of the main drive shaft 25 where it is pivoted at 256 to a lever 257 pivoted at 258 to the frame piece 15 and normally drawn upward by a spring 260 which also pulls downward on the lever 55. The lever 257 carries a follower roller 261 which bears against a cam disc 262 on the shaft 25. The periphery of this disc is in two concentric arcs connected by inclines, one of these arcs of greater diameter than the other, and so set and designed that the high part of the cam 262 holds the stop 236 in its effective position during the proper part of the cycle of operations and the low part of the cam allows the springs 244 and 260 to lift the card stop out of the path of the card at the proper time.

In order to operate the picker the shaft 22, which is connected by arm 21 and link 20 with said picker, is journaled at its ends in the two frame pieces 15 and 16 projecting through the latter as shown in Fig. 3 and inside of the box-like part of the frame 15 it is provided with an arm 263 which is connected by a horizontal link 264 with another arm 265 which is pivoted at 266 to the frame piece 15 (see also Fig. 22). The arm 265 carries a follower roller 267 which runs on a cam 268 fast on the shaft 25 and having an outline adapted to reciprocate the picker at the proper times. The picker is drawn rearward to feed the card by means of a strong spring 270 connected at one end to a stud 271 on the arm 263 and on the other end to a stud 272 on the frame 15. In the normal operation this spring will cause the follower roller 267 to be pressed continually against the cam 268 but will enable the picker to be locked in its forward position out of operation without interrupting the rotation of the shaft 25.

In order to stop the machine automatically when there is no card in the sensing chamber, devices are provided as shown in Figs. 4, 7, 8 and 26. As shown in Fig. 7, the left-hand casting 165 of the selecting unit has mounted on it a sheet metal bracket 273 in which is mounted a feeling pin 274 similar to the pin 204 at the other end of the same unit, said pin 274 being pressed upward by a light spring and adapted when the unit is moved upward to be arrested by the end of a card in case there is one in position. If this pin 274 is not arrested, it moves upward a pin 275, Fig. 26, which is pivoted at its upper end to an arm 276 mounted on the end of the rock shaft 70 on which the stop arm 68, hereinbefore described, is mounted. The construction is such that in case there is no card in the sensing chamber, this arm 68 will be swung forward and the machine will be stopped in the manner hereinbefore described. The shaft 70 is journaled in the bracket 146 as indicated, for example, in Fig. 4.

It may sometimes be desirable to stop the machine automatically at a certain point in the operation. For example, the machine may be working on a record sheet capable of recording a certain number of items and it may be desired to stop the machine after that number of items has been printed. To this end a stop card 277, shown in Fig. 26, may be inserted at the appropriate position in the stack of cards. This is simply a blank card with a notch 278 cut in the end of it to allow the pin 274 to pass through. This card would stop the machine and give the operator an opportunity to remove the filled record sheet and put in a fresh one.

In order to stop the machine automatically when the supply of cards in the hopper is exhausted, a feeler pin 280, Figs. 1, 24 and 25, may be provided, this pin projecting upward into one corner of the hopper and being pressed downward by the cards 281 in said hopper, the usual weight 282, which is ordinarily laid on top of a stack of cards, having its corner cut away at 283 so as not to hold the pin down.

The pin is mounted on a lever 284, the hub of which is loose on a certain rock shaft 285 projecting inward from the frame 15, and is controlled by a light spring 286. Said lever is connected by an upright link 287 with a lever 288 loosely mounted on the shaft 70 and having a pin 290 projecting from it underneath the arm 276. The construction is such that if, as shown in Fig. 25, there is no card in the hopper, the spring 286, acting through the train of mechanism described, will raise the arm 276, swing the stop arm 68, and move the interponent 66 underneath the lug 65 and cause the machine to be stopped at the proper point in the cycle.

Some improvements have been made in the magazine 17 which are brought out in Figs. 29, 30 and 31. As heretofore constructed this has included two end brackets 291 having front flanges 292 and 293 to guide the cards and, at the point marked 294, a cross bar which closed the rear part of the magazine near the bottom thereof. It is sometimes desirable to use cards like those cards 295 shown in Fig. 29 with tabs 296 for filing purposes and the bar has therefore been cut away to provide room for these tabs leaving merely two blocks 294 as shown in Fig. 29. These blocks are joined together by a cross plate 297 which now forms the rear wall of the magazine. The feed rolls 87 and 88 are made short enough so that the tabs 296 are not engaged by the rolls.

An improved throat lock or stop is also provided comprising an adjustable slide 300, the lower edge of which stands just above a plate 301 in the base of the magazine. The adjustable bar or throat lock 300 is mounted in a shallow groove 302 milled in the front face of a block 303 which is secured by screws 304 to the front face of the plate 297. The upper end of said bar 300 is bent rearwardly to form an ear 305 which is perforated and fits loosely over an adjusting screw 306 screwed into the block 303 and having a flange 307 which limits the downward motion of the part 300 which latter is drawn downward by a spring 308 strained between the ear 305 and a pin 310 on the rear of the plate 297. The block 303 has a key-hole slot 311 with an under cut groove 312 into which fits a headed pin 313 which, together with the screw 306, guides the bar 300 for up and down sliding motion. The upward motion is limited by a screw 314 inserted into the block 303 with its head lying in a cut-out 315 in the slide 300. Said slide has a notch 316 for the finger nail of the operator by which the slide can be raised at any time. The adjustment of the stop screw 306 is maintained by cutting a slot 317 across the upper end of the block 303 and providing a tightening screw 318. After the stop screw has been adjusted, the screw 318 is tightened springing the branch 320 of said block and putting friction on the threads of the screw.

Out of shape or warped cards occasionally jam in the machine and under those conditions the operator may stop the machine, raise the slide 300 to provide a wide throat and turn the machine backward by manipulation of the belt 43 until the cards are backed out of the machine into the magazine; without destroying the card. This device when needed may save ruining a number of cards and thus spoiling an entire run.

In order that a total may if desired be taken automatically at each change of designation, means are provided whereby the machine may be set almost instantly so as to use any desired column or columns of the card as designating columns. When so set, the machine on each change of designation acts automatically to interrupt the operation of the picker so as to stop the feeding of cards from the magazine; to retain the card stop 236 in its lower position so as to hold in the sensing chamber the first card of the new group; to hold the bail 1611 and all the latch plates 161 in their forward positions so that the registering pins 158 will not be locked up and so that the machine makes an idle or spacing operation; to hold the parts above described in the same positions during the second or total-taking cycle; to set the total-taking mechanism at the beginning of the second or total-taking cycle; and then to restore the parts to normal operation so as to tabulate the first card of the succeeding group which card has until then been retained in the sensing chamber. These functions are performed by means positively driven by the operating mechanism when the machine senses a change of designation.

The means for sensing a change of designation is best shown in Figs. 1, 10, 19, 20 and 32. Above each latch bar 161 in the registering unit is mounted a somewhat similar bar 321 consisting of a grid with vertical slots, and from each pin 158 a stud 322 projects into one of said slots. The bars 321 are the devices which sense a change of designation, therefore, they may be appropriately termed sensing bars or change of designation sensing means. The right-hand wall of each such slot as viewed in Fig. 10 is formed with a rounded nose or cam projection 323. The construction is such that when one of the pins 158 is moved up or down, the bar 321 would be slid to its right-hand position in Fig. 10 and ordinarily it would remain there because this bar is not provided with an individual returning spring. In ordinary operation, therefore, this bar is idle and functionless.

Means are provided whereby any one of the bars 321 can be held normally in its rear position (its left-hand position in Fig. 10) and whereby in case one of the associated pins 158 is moved up or down the stud 322 acting on the nose 323 will move the bar 321 toward the front of the machine and will set the total-taking mechanism into operation. A frame plate 324 is suitably secured to the forward bar 143 by end brackets bent off from the plate and the frame thus constructed and mounted has in it an upper cross rod 325 and a lower cross rod 326. On the rod 325 there are mounted a series of hand-settable column selecting levers 327, Fig. 19, each of which has pivoted thereto at 328 a slide bar 330 which near its lower end is guided against lateral displacement in one of the slots of a comb made in the lower rear edge of the plate 324 as shown in Fig. 10. The levers 327 are similarly guided in a comb made in the upper edge of the plate 324 with its teeth bent rearward as shown in Fig. 10. Each of the bars 330 has a hole 331 into which a rounded projection 332, pressed outward from the body of lever 327, may be snapped. This lever also has a stop lug 333 bent off therefrom. These levers 327 are normally tilted forward to a position where the lug 333 is arrested by engaging the forward end of the bar 330 in which position the parts are retained by the projection 332 snapping into the hole 331. In this position the bars 330 occupy their upper inactive positions. In case it is desired to use some particular column as a designating column, the corresponding lever 327 is tilted or rocked rearward to the position shown in Fig. 19 which has the effect of setting the bar 330 in its lower position. All of these bars are made with slots 334 which straddle and are guided by the rod 326, said slots being enlarged rearwardly at their upper ends as shown in Fig. 10 so that when a bar 330 is in its lower position as shown in that figure it can be rocked slightly toward the front of the machine.

Each bar 330 has a lug 335 at its lower end which normally stands higher than the upper edge of the corresponding bar 321, but which when the bar 330 is lowered abuts the front end of said bar 321.

A rock shaft 336, journaled in the end brackets of the plate 324, has two depending arms 337 which support a cross bail rod 338 lying just in front of the lower ends of all of the bars 330. This bail structure is under the tension of a spring 340, Fig. 27, tending to move bail 338 toward the rear. The construction is such that when one of the bars 330 is set in its lower position shown in Fig. 10, the bail rod 338 presses the lower end of said bar and with it the slide plate 321 toward the rear of the machine. If now one of the pins 158 of that row be moved upward or downward it will impart a momentary forward motion to the slide 321, slide 330 and bail 338. The pin thus elevated will be a designating pin and the machine will continue to operate with this pin retained in its upper position until a change of designation. When a new pin in the same row is operated, it will again move slide 321 toward the front of the machine, actuating the bail 338 and initiating a new total-taking operation. If two or more levers 327 are set to active position, a change in any one of the columns thus selected, will operate the bail 338.

Fig. 32 shows a fragmentary front view of the set of column selecting levers 327. A scale plate 341 is mounted just beneath the row of levers and marked with numerals to indicate the rows or columns of pins from 1 to 45 inclusive. As will be understood by a comparison of Figs. 32, 1 and 4 the handle parts of these levers 327 are set at two different angles alternating with each other for convenience of manipulation so as to prevent adjacent handles from being too close together.

The springs 160 are strong enough to operate the bail 338 when the pins 158 are restored to lower position, and it is partly for this reason that the analyzing pins 174 are provided with much lighter springs and with the lock plates 187 to force them and the pins 158, etc., upward positively.

The mechanism set into operation by the bail 338 will now be described.

The total-taking operations of the machine are controlled by a shaft 342 journaled in the bracket 146 hereinbefore described and having thereon certain cams for controlling parts of the machine. In order to turn this shaft step-by-step it has mounted on its outer end a ratchet wheel 343 (Fig. 19) which is engaged by a driving pawl 344 pivoted at 345 to a lever 346 pivoted at 347 to the bracket 146. The pawl 344 is controlled by a spring 348 and its motion about its pivot is limited by a pin 350 playing in a notch in the lever 346. Said lever 346 is normally drawn downward at its rear end by a spring 351. The pawl 344 is operated a plurality of times at each taking of a total and after the last of said times it is held in its normal position by a locking arm 352 engaging over a shoulder 353 on the forward end of the lever 346. This locking arm prevents the lever 346 from being returned by its spring 351 to position for the pawl 344 to engage another tooth of the ratchet and the operation of said ratchet is thus stopped. During tabulating operations this lever is held in its inactive position by the locking arm 352. Said locking arm is rigidly mounted on the rock shaft 336 which is controlled as above described. As long as there is no change of designation the cam shaft 342 is retained in its normal position, but as soon as a card is sensed having a different designation, the shaft 336 is rocked and the arm 352 releases the lever 346 which is immediately snapped downward and the operation of the cam shaft begins.

In order to move the rear arm of the lever 346 upward at each operation of the machine, a bar 354 (Fig. 19) has its upper end beneath said lever arm, said bar being guided at its upper part in the plate 58 and at its lower end pivoted at 355 to a lever 356 pivoted at 56 in the frame box 15. The lever 356 has a follower roller 357 riding on a cam 358 on the drive shaft 25 which cam throughout the greater part of its periphery is concentric, but which has a cam projection 360 (Fig. 27) which imparts an upward motion to the bar 354 once in each rotation of the shaft, namely, at just about the beginning of a cycle of operations. Said bar will therefore be moved up and down once at the beginning of each cycle of the machine, but it will operate the lever 346 and impart a step of motion to the shaft 342 only when the locking arm 352 is released.

On taking a total the shaft 342 is moved three steps, the first to cause a spacing operation, the second to cause a total-taking operation and third to restore the mechanism to position for tabulating. The number of teeth in the ratchet 342 is therefore a multiple of three, nine teeth being shown in the present instance. All of the cams on the shaft are therefore arranged triple so that a one-third rotation of each cam made in three steps will cause the cam to perform its necessary functions.

If means were not provided to the contrary the latch 352 would snap back over the shoulder 353 after the first operation of the lever 346 and thus prevent the two succeeding operations. The following mechanism is provided to control this latch lever. A cam 361 (Fig. 19ᵃ) is mounted on the shaft 342 just outside the ratchet wheel 343 (Fig. 4). This cam disc has in it nine rounded notches arranged as follows, namely, one deep notch 362 followed by two shallower notches 363. In the normal or tabulating position a follower roller 364 mounted on the end of a locking lever 365 occupies one of the deep notches 362 into which it is drawn by a spring 366. The lever 365 has a forwardly directed arm 367 with an abrupt end which normally lies beneath a pin 368 projecting from the side of the latch lever 352. The construction is such that said latch lever is then free to move over the shoulder 353 of the lever 346. When, however, one unit of motion has been imparted to the shaft 342, roller 364 is moved into one of the shallow notches 363 at a greater distance from the shaft, thus rocking arm 367 into the path of pin 368 and preventing lock 352 from operating. The parts occupy that position during the spacing cycle. On the second step of the shaft 342 the roller 364 moves into the second shallow notch and holds latch 352 inactive during the total-taking cycle. On the third step of the shaft the roller 364 moves into the next deep notch 362 allowing the locking arm 352 to snap into locking position and prevent further operation of shaft 342.

In order to stop the operation of the picker during the spacing and total-taking cycles, a cam disc 370 is mounted on the shaft 342, Fig. 22. This disc has three low parts 371 and three high parts 372, and a follower roller 373 normally lies on one of the low parts 371. On the first step of the rotation of shaft 342 one of the high parts 372 moves under roller 373 and holds it in its upper position during the spacing cycle. At the second step of the shaft the roller is still held in its high position during the total-taking cycle and at the third step of the shaft it runs down onto the next low part 371. The follower 373 is on a two-armed lever 374 pivoted at 375 to the bracket 146 and having at its forward end a pin 376 which is normally held by a spring 379 in the upper end of a slot 377 in the upper end of a link 378 which at its lower end is pivoted at 380 to an arm 381 on a shaft 382 which shaft extends into the frame member 15 (Fig. 5) where it has mounted on it a latch or pawl 383, the hooked end of which normally stands as shown in Fig. 22 just above a locking notch 384 in the link 264 which is part of the mechanism for operating the picker. When during the first and second positions of shaft 342 roller 373 is maintained in its upper position, the latch 383 descends to its lower position shown in Fig. 5 where it locks the link 264 and the picker itself in their extreme forward positions and holds them there during the spacing and total-taking cycles. As soon as shaft 342 makes its third step, this lock is released and the picker resumes operations. A spring 379 connecting the lever 374 with link 378, can yield in case the hook 383 is caught, and thus prevent injury to the mechanism.

In order to hold the first card of the new group in the sensing chamber means are provided for retaining the card stop 236 in its lower, active position during the spacing and total-taking cycles. To this end the shaft 342 has mounted thereon a cam disc 385 (Fig. 21) whose periphery is engaged by a follower roller 386 rigidly mounted on the rock shaft 252. This cam disc has three concave low parts and three concentric high parts, one of the low parts being normally at the roller 386 as shown in Fig. 21. The first step of the shaft 342 brings over said roller the first portion of the next succeeding high part of the cam disc, thus maintaining the card stop 236 in its lower position during the spacing cycle. The second step of shaft 342 brings the last portion of the high part of the cam disc over the roller 386 and still maintains the card stop down during the total-taking cycle. The third step of the shaft brings one of the low parts of the cam disc 385 over the roller 386 and thus restores the card stop to the control of its regular operating mechanism.

In order to set the machine for taking totals in the ordinary way, the usual link 12 must be pulled down at the beginning of the total-taking cycle and held down during that cycle. As shown in Fig. 23 the lower end of this link is pivoted at 387 to an angle lever 388 pivoted to the bracket 146 at 390, said lever having on its other arm a follower roller 391 pressed against the periphery of a cam disc 392 mounted on the shaft 342. In Fig. 23 the nine positions of this disc, that is to say, the three groups of three positions each, are indicated by the letter N, this being the normal or tabulating position, the numeral 1 indicating the position during the spacing cycle and the numeral 2 indicating the part of the cam which is under the roller 391 during the total-taking cycle. Parts N and 1 of this disc are low and parts 2 are high. The link 12, therefore, occupies its normal upper position during the tabulating operations, it remains there after the first step of shaft 342 during the spacing operation, and it is pulled down at the beginning of and is held down during the total-taking cycle; and it is released and snaps back to normal position very early in the next cycle.

It will be obvious that this mechanism could be arranged to give space-total-space by simply modifying the action of the shaft 342. In case that were desired, the positions of this shaft would be some multiple of four instead of three. Cam disc 392 would have three low positions followed by one high one and it would normally occupy the middle one of the three low positions. All of the other cams would be correspondingly modified so as to hold the picker inactive for three cycles instead of two, to hold the card stop active for three cycles instead of two, and to hold the locking lever 365 active for three cycles instead of two; also the latch bars 161 would be held inactive for three cycles.

The stop pins 7 are moved upward at every cycle of the machine and if these pins operated during space and total taking cycles the same as during tabulating cycles the sectors 5 and 6 would be controlled by them the same as in tabulating cycles. In order to prevent this the registering pins 158 are not locked in their upper positions during their space and total taking cycles so that although they move up and down they do so at times, as will be more particularly explained hereinafter, when the sectors 5 and 6 are in their normal retracted positions. The stops move out of the way before said sectors would be ready to move. To this end, as shown in Fig. 20, the disc 385 has cooperating therewith a follower roller 393 on an arm 394 fast on the shaft 1613. During tabulating cycles this roller occupies the position shown in Fig. 20; that is to say, it registers with a low part of the cam disc 385. When this disc is given its first step the roller runs on to a high part of the cam forcing the bar 1611 and all of the latch plates 161 toward the front of the machine where they are incapable of locking the studs 163 on the pins 158. At the first step of the shaft 342 the very first portion of the high part of the cam runs under the roller 393. At the second step, preparatory to the total taking cycle, the high part of the cam is still under the roller so that the latch plates 161 are held inactive both during the entire space cycle and during the entire total taking cycle as will be explained more in detail under the head of "Timing". The high part of the cam 385 runs from under the roller 393 very early in the first tabulating cycle. The pressure of the spring 395, connected with the arm 394, not only restores the bar 1611 to its inactive position but acts on the cam 385 to bring the shaft 342 to the position shown in Fig. 20 with a snap, the shaft running ahead of its driving pawl 344. After the roller 393 gives its first impulse to the shaft 342 the latter is centered accurately in its normal or tabulating position by the roller 364, Fig. 19ª, engaging in one of the deep notches 362 of the cam plate 361.

The operations just described would tend to make the third step of the shaft 342 take place rapidly, the shaft turning in advance of its driving pawl 344 and introducing the danger of an overthrow of the shaft. To prevent this a second ratchet wheel 396 is mounted on said shaft and has its teeth facing in the opposite direction to those of the driving ratchet 343. A stop pawl 397 influenced by a spring 398, is pivoted on the pivot 345 and it has a hook-shaped end in the plane of the wheel 396. This pawl, of course, moves up and down in unison with pawl 344 and when the pawls occupy their highest position, the hook is out of engagement with the ratchet 396, but during the upward motion of the pawls this hook rides a short distance in advance of one of the teeth of said ratchet. The result is that when the followers run onto the low parts of the cams and tend to throw the two ratchet wheels forward ahead of pawl 344, this hook is in position to check the rotation and prevent overthrow. Before it reaches its highest position it is moved up above the tooth which came up just behind it.

The stud 350 on pawl 344 extends into a hole 399 as shown in Fig. 33 which shows the parts at the bottom of the stroke of the arm 346. In that position the pin 350 is in the forward part of the hole 399. As the arm 346 moves upward the ratchet wheel 343 guides the pawl 344 upward and leftward in Fig. 33 until at the extreme top of the stroke the pin 350 is in contact with the left-hand side of the hole 399. As the arm 346 descends, the pawl 349 sliding over the inclined part of a tooth of the ratchet 343 is guided leftward and holds the pawl 397 out of contact with the ratchet 396 so that this pawl 397 comes down and engages in front of the next succeeding tooth of said ratchet 396. In the first two steps of the shaft 342 the pawl 397 is not engaged by a tooth of the ratchet 396, but when said ratchet is snapped forward early on the third step, said pawl does arrest the oncoming tooth and prevents overthrow as described.

It has been explained above how a total is taken automatically on a change of designation in the designating column or columns. It has also been explained that the restoring springs 160 of the pins 168 are much stronger than the springs 175 of the pins 174 and that they are in fact strong enough to set the total-taking mechanism into operation on the down stroke of a pin 158. It has also been explained that substantially at the end of each tabulating cycle of the machine the bail bar 1611 moves all of the locking slides 161 forward, unlocking all of the pins 158. If now a blank card be fed into the sensing chamber, the elevated pin 158 in the designating column would snap down to normal position, thus initiating a total taking operation. When, therefore, the last stack of cards has been put in the magazine so that the top card will be not only the last card of a group, but will also be the last card of that run, the operator simply lays two blank cards on the top of the stack, which cards will ultimately be the only cards left in the magazine and they will serve to hold down the feeling pin 280, Figs. 24 and 25, and prevent the machine from being stopped with the last perforated card still in the sensing chamber. When the first blank card is fed into the sensing chamber, no analyzing pins 174 will move upward and the previously set pin 158 in the designating column will therefore snap down along with all the other elevated pins and will set the machine for a total-taking operation. Meanwhile, the second blank card will continue to hold down the pin 280 and prevent the machine from stopping. As soon as the total-taking operation is initiated the picker stops so that this last blank card will remain in the magazine until the total has been taken and the total-taking mechanism restored to normal. The picker will then feed the last card into the analyzing chamber and the parts controlled by the feeling pin 280 will stop the machine. It will be perceived that if the magazine is exhausted in the middle of a run merely by the exhaustion of such cards as the operator may have stacked therein, the machine will stop with the last card in the analyzing chamber and with the picker in position to feed in a new card. The operator may then simply put in another stack of cards and press the starting button 71 whereupon the machine will proceed with its tabulating operations without taking a total. However, when it is desired to take a total after the tabulation of the last card, this can be done by putting in two blank cards as desired.

The operations just above described leave the machine in condition to start a new run of cards, the last blank card of the preceding run remaining in the sensing chamber. When a new stack of cards is put in the magazine and the button 71 is pressed, the machine will immediately feed in the first card of the new run and feed out the blank card. If the machine is set for automatic control of total-taking, the first sensing operation will push up a pin in the designating column or columns and set the machine for taking a total. However, the first card will, during this operation, remain in the sensing chamber and no other cards will be fed until the total-taking operation is complete, after which the machine will proceed to tabulate the cards of the new run. This total-taking operation, automatically effected at the beginning of a run, will, of course, find the totalizers in the tabulating head all clear. If, by some mistake, the machine had been left with amounts indicated in said totalizers, those amounts would be printed on the paper and would instantly make the mistake apparent. This automatic initial total-taking operation is, therefore, a safeguard against that error.

It may sometimes be desired to set all of the automatic column selecting levers 327 to inactive position and to take a total by means of a total card instead of automatically by a change of designation. In order to make this possible the forty-fifth or last column mechanism has been modified as shown in Fig. 27. In that position a bar 400 is put in place of the bars 321 and this has only one slot for the reception of a stud 322, namely, that for the pin 158ª in the 12th position of the column. The stud 322 works in a slot in the bar 400 which slot is provided with a projection 323 the same as on the bars 321. This particular pin, however, has no stud like the studs 163 for locking it in its upper position. The position of this pin 158ª is indicated in Fig. 28. The bar 400 does not cooperate with any selecting bar 330, but is itself prolonged so that it contacts with the bail rod 336. The construction is such that if at any time a total card 401 (Fig. 28) having in it a single hole 402 in the twelfth position of the 45th column is run through the machine. the pin 158ª will be operated and cause the taking of a total in exactly the same way as has been described above, that is to say, by rocking the bail 336, 337, 338. The card 401 should, of course, be preceded by a blank (space) card; and if the total card is the last card of a run, it should be followed by a blank card to prevent stopping of the machine by the feeling pin 280. After the total-taking operation the total card will be fed out of the machine. If there are other cards above it in the magazine, the machine will proceed to tabulate them without stopping. If only a blank card is left in the magazine, it will be fed into the sensing chamber and the machine will be stopped by action of the feeling pin 280.

*Timing*

The present tabulator can be operated materially faster than the old Powers tabulator. This increased speed of operation is due to a number of features. For one thing the analyzing unit is moved up and down by eccentrics which give it a harmonic motion or harmonic reciprocation better adapted for high speed than the more uneven motions due to cams. The principal reason, however, is in the relative timing of the parts.

When the machine stands in the initial position shown in Fig. 1 the main shaft 8 of the tabulator head is about in its normal position (Fig. 33), that is to say, it is rocked its greatest distance toward the rear; the picker blade is in its forward position and the sensing unit is in its uppermost position, or substantially so. The sectors in the adding head are moved forward by the usual bail bar 501 mounted on arms 502, pivoted on the same cross rod 503 as the sectors themselves. One of these arms 502 has a follower roller 504 running in a cam groove 505 in a plate or arm 506 pivoted at 507 and operated by a long link 508 connected to the operating cam 510 of the machine, which cam is mounted on the shaft 8. The cam groove 505 has its first part constituting a dwell so that the bail 501 and the type sectors 5 do not begin to move forward until the cam sector 510 has moved a certain distance; and on the return stroke the bail 501 and the type sectors themselves are restored to normal position before the cam 510 reaches its normal position. The whole construction is such that the gear sectors 6 are about ready to move forward of their zero positions at the time when the main drive shaft 25 has made about 70° of rotation from initial position, and on the return stroke these sectors have been restored to zero position at about 290°. There is thus a period of about 140° of the rotation of the main shaft, namely, about 70° at the end of one cycle and 70° at the beginning of the next cycle, during which the sectors 6 are at, or back of, their zero positions.

The sensing unit moves up and down to an extent greatly in excess of the up and down motion of the stops 7. This unit has moved upward some little distance before the feeler pins 174 touch the card, and after passing through the card they move some distance further before they encounter the pins 158. There is a little lost motion between these pins and the wires 212 in the connection box, and there is further lost motion between the upper ends of these wires and the lower ends of the stops 7. The whole construction is such that these stops 7 begin to move up at say 306° of the motion of the main shaft. They are at the extreme top of their motion at about 357° and in case they are not locked up by the latch plate 161 they will have returned to normal position at something like 48° of motion of the shaft on the next cycle. It will be perceived that when, as in total-taking operations, these pins are not locked, their entire up and down motion is made during that period in the cycle when the sectors 6 are in retracted positions. It is for this reason that these pins can move up and down during a spacing cycle and during a total taking cycle without affecting the sectors 6.

In tabulating cycles the pins are locked in their upper positions by their latch plates 161 (see Fig. 33). The cam 52 releases the latch plates 161 at about the end of the cycle so that the pins which were raised in the preceding cycle are released at about the time when the pins of the current cycle are elevated. The releasing motion of these latches is caused by a mere hump 53 on the cam 52 and the latches immediately snap back so as to retain in their upper position the pins that have been pushed up under the control of the card then in the sensing chamber.

A portion of the superior speed of the machine is due to the construction and mode of operation above described. The sensing of the new card has already begun while the tabulator head is adding and printing the amount set up by the next preceding card.

The picker 18 is in its initial position at the beginning of the cycle. It picks up the new card at about 40 or 42° of the cycle. This card enters the feed rolls 87, 88 at about 104° and its forward edge enters the card chamber at about 135°; meanwhile the cam 262, Fig. 21, has raised the card stop 236 and released the preceding card at about 130° so that that card immediately begins to feed out of the chamber. The cam 262 moves the card stop 236 down to operative position just behind the card that is moving out of the chamber and just in front of the one that is moving in. The new card comes aaginst the stop at about 225°. At about 233° the analyzing unit has risen far enough for the pins 174 to enter the card chamber and these are pressed against the card at about 250°. At this time the sectors 5 and 6 are in the midst of their return stroke which, as above explained, has brought sectors 6 back of the zero stops at about 290°. The analyzing box gets high enough at about 306° to begin to move the stops 7 upward. It will be observed that at about the time, namely, between 130° and 140° of the cycle, when the sectors 6 have moved far enough to reach the nine stop 7 in the current cycle, the new card for the next cycle is just about entering the sensing chamber. This is made possible by the fact that the latches 161 are holding the pins 158, connecting wires 212 and stops 7 in their elevated positions.

The cam 358, 360 (Fig. 27) which operates the pawl 344 and the shaft 342, as shown in Figure 33, begins to act at about, or perhaps a little before, the end of the cycle. In that operation when it imparts the third step to the shaft 342, the pawl 344 has, at about 9°, turned the shaft far enough so that the roller 393 snaps it over and completes its motion, thus releasing the roller 391 which controls the total shaft 10 of the tabulator head so that said total shaft snaps back to its normal position at about 9 or 10° of the next succeeding tabulating cycle. All of the other parts are restored to their normal positions at about that time so that during that cycle a normal tabulating operation is performed on the first card of the new group which has, meanwhile, been retained in the sensing chamber.

At the beginning of each cycle there is a period of a little over 40 degrees during which, in a tabulating operation, no vital operation of the machine is going on except that the sensing unit is moving downward. It is during this period that the stepping movements are imparted by the cam 358, 360 to the shaft 342. In the second step of this shaft the total shaft 10 of the head has completed its downward motion at about 40°. There is thus a period of something like 40° in which a card is held in the chamber, the sectors 5 and 6 are retained in their normal positions and the picker has not yet picked up a card, this period being devoted to the necessary operations to bring about the space cycle, the total taking cycle or the restoration to the next tabulating cycle as the case may be, all of this being done before the other parts of the machine begin their operations. As explained above the new card is picked up by the picker at about 42° and the sectors 6 are not ready to move past their zero positions until about 70°. There is, therefore, a period at the beginning of each cycle in which, on occasion, the shaft 342 may set the mechanism to control the operation of the machine during that same cycle.

It may be worth while to mention again the overlapping of functions. The stops 7 are fully set and the previously set stops 7 are released by the end of a cycle. During the first half of the next succeeding cycle, the sectors move forward into position to print the amount, and while they are doing so a card is being fed into the sensing chamber; and during the second half cycle the restoration of the sectors in the head and the sensing of this new card are both going on; and the stops 7 for the next succeeding cycle begin to move to their upper positions just after the sectors 5 and 6 have been restored. The operations are done by eccentrics so that their motions are smooth and harmonic in character but there is an overlapping of them; the lower part of the machine introducing the new card and sensing it while the upper part of the machine is going through its cycle under the control of the preceding card.

What I claim as new and desire to secure by Letters Patent is:

1. In a machine of the class described, the combination of totalizers and actuators therefor, and a pair of pin boxes with corresponding pluralsets of rows of pins therein for controlling said totalizers and actuators, the construction and arrangement being such that one of each pair of corresponding rows of pins has a locking slide and the other of each pair has a locking slide and an additional sensing slide associated therewith, each of said locking slides being cooperative with its respective row of pins for locking them and the sensing slide being operable by the combined action of the pins of the pair of rows for modifying the operation performed by said totalizers and actuators.

2. The combination of two pin boxes containing corresponding sets of cooperable spring-urged pins, one of said boxes being movable relative to the other; means for locking the pins of the movable box against relative movement; means for locking the pins of the stationary box in effective position; a designation control device; and means controllable by movement of a pin of the stationary box from ineffective to effective position and from effective to ineffective position to effect operation of said designation control device.

3. In a machine of the class described, the combination of a continuously operable harmonically reciprocating sensing pin box; spring pressed pins therein; differentially movable actuators; members movable by said pins from ineffective to effective position relatively to said actuators; and means, including spring pressed slides, for locking effectively positioned ones of said members during a substantial portion of each reciprocation of said pin box to control the extent of movement of said actuators.

4. In a machine of the class described having differing cycles of operation; two pin boxes movable relative to each other and each containing a plurality of rows of spring pressed pins; means for reciprocating one of said boxes; means for unlocking and relocking the pins of the other box during each reciprocation of said first box; optionally operable means associated with each row of pins of the second mentioned box, said means including a designation sensing bar; an operation controlling member and an interponent adapted to be manually interposed between said sensing bar and said controlling member for rendering the latter operable by the former, whereby any desired grouping of rows of pins may control the character of operation of the machine as an incident to the reciprocation of the movable box.

5. In a machine of the character described, the combination of a card magazine comprising four corner pieces forming a substantially rectangular enclosure and a plate notched on its lower edge fastened to the rear pieces; a card picker, card feeding rolls of less width than the card used projecting into the notch of said rear plate and means for operating the picker so that cards stacked in the magazine will be picked from the stack and accepted by the rolls at determinate moments, the construction and arrangement being such that cards with indexing tabs thereon will be fed in the same manner as cards without such tabs.

6. In a machine of the class described; the combination of totalizers and actuators therefor, a pair of record controlled relatively movable pin boxes with corresponding plural rows of sets of pins therein for controlling the extents of movement of the said actuators and the elements of said totalizers, means the construction and arrangement of which are such that one of said pin boxes retains the reading of both the designating and listing fields of a record and automatic means including record controlled slides for erasing the retained reading.

7. The combination of two pin boxes containing corresponding sets of cooperable spring urged pins; one of said boxes being continuously harmonically reciprocable relative to the other, means for locking the pins of the reciprocable box at about the quarter point of the cycle thereof; means for unlocking the pins of the other box shortly before the reciprocable box reaches the mid point of its cycle; and means for re-locking the last mentioned pins shortly after the reciprocable box has passed the mid point of its cycle, whereby pins in the non-reciprocable box, which are operable on two successive reciprocations do not move between said reciprocations but are maintained in operated position.

8. In a machine of the class described, the combination of a continuously operable harmonically reciprocatory sensing pin box, spring-pressed pins therein, differentially movable actuators, members movable by said pins from ineffective to effective position relatively to said actuators, means for locking certain of said pins in normal positions relatively to the sensing pin box, and means for locking effectively positioned ones of said members in such position for controlling the extent of movement of said actuators.

9. In a machine of the class described, in combination, a drive shaft; mechanism for sensing a change of designation in a record, a shaft carrying a cam for effecting machine control; and means comprising a cam on said drive shaft, a link operated by said cam, a pawl and a ratchet operated by said link and controlled by said change of designation sensing mechanism for actuating said cam shaft and thereby effecting control of the machine.

10. In a machine of the class described, in combination, a drive shaft; a sensing mechanism continuously operated thereby; a change of designation mechanism operable by said sensing mechanism in accordance with perforations in successive record cards; a reciprocable link operated by a cam on said drive shaft; a lever adapted to be oscillated by said link; means for normally preventing the oscillation of said lever; an auxiliary shaft carrying a ratchet wheel and a plurality of cams, said ratchet wheel adapted to be driven by a pawl on said lever, said last mentioned cams being adapted to effect machine control; and means operated by said change of designation mechanism to release said lever for oscillation, whereby said auxiliary shaft is intermittently rotated to effect a definite sequence of machine operations under control of the cams thereon.

11. In a machine of the class described, a set of reciprocatory spring pressed pins, a second set of reciprocatory spring pressed pins arranged in columns and individually advanced by selected pins of the first set entering record card perforations, means associated with each column of pins in said second set for latching the pins thereof in advanced position, change of designation determining means associated with each column, a shaft carrying a plurality of cams for effecting control of the machine, means for rendering said shaft intermittently operable, and means universal to said change of designation determining means for controlling said intermittently operable means.

12. In a machine of the class described, a set of reciprocatory spring pressed pins, a second set of reciprocatory spring pressed pins individually advanced by selected pins of the first set entering record card perforations, a sensing slide actuated by either advance or return movement of a second pin, a shaft carrying a plurality of cams, a bail universal to said sensing slides, and means associated with said bail for rendering said shaft intermittently operable to control the machine.

13. The combination of a movable sensing pin box, sets of spring-pressed pins therein, means for locking and unlocking each of said sets of pins during movement of the sensing pin box, a stationary pin box, sets of spring-pressed pins therein each of which pins is in exact register with one of the first named pins, a reciprocable locking slide and a designation sensing bar for each set of the last named pins, and means operative after the first named pins are locked for moving the said last named pins to locked position against the tension of their respective springs, and for effecting a reciprocation of said slide and the reciprocation for said bar.

14. In a machine operating in differing cycles, two pin boxes movable relatively to each other and each containing a plurality of rows of spring-pressed pins, means for effecting movement of one of said boxes relative to the other, means for determining the cycle through which the machine shall operate, said last named means comprising a latching slide and a change of designation sensing bar for each row of pins in one of said boxes, each of said sensing bars being displaced by either the advance or return of any of its associated pins, and means actuated by said bar for causing a change in the operating cycle of the machine.

15. In a machine of the class described, a reciprocating pin box containing plural rows of spring-pressed pins, means including a perforated record for selecting pins of each row to remain stationary relative to said box, means including a spring pressed slide for locking said pins in relatively stationary position, cam operated means associated with said reciprocating box to render said locking means ineffective, and means including a sensing pin and a lever operable thereby for locking said cam operated means in position to retain said locking means in ineffective position.

16. In a machine of the class described, the combination of a pair of pin boxes each having a plurality of corresponding rows of spring-pressed pins therein; one of said boxes being continuously harmonically reciprocable relatively to the other, the spring pressure of the pins of one box being inferior in strength to the spring pressure of the pins of the other box, the pins having springs of inferior strength being opposed during a portion of the reciprocation by the pins having springs of superior strength; means for conditioning the pins having the springs of inferior strength to move the pins having springs of superior strength; and record controlled means to render said conditioning means ineffective.

17. In a machine of the class described, the combination of record feeding means including a card picker; a harmonically reciprocable record sensing mechanism; a totalizer and actuators therefor; a series of reciprocable pins, operable by said sensing mechanism, to govern the extent of actuation of said actuators; means for locking said pins in the position to which they are moved by said sensing mechanism; and optionally operable means for rendering said picker and said extent of actuation governing means ineffective by the advance or return of one of said pins.

18. In a machine of the class described, the combination of a reciprocatory assembly of spring-urged sensing pins, a second assembly of spring-urged pins actuated by selected pins of the first assembly entering perforations in a record card, means for latching the pins of the second assembly in actuated position, means for reciprocating said first assembly continuously according to the principles of simple harmonic motion, and means associated with the last named means to release latched pins of the second assembly.

19. In a machine of the class described, the combination of a harmonically reciprocable pin assembly comprising a set of individually reciprocatory spring-pressed pins, a second assembly cooperating therewith and comprising reciprocatory spring-pressed pins individually advanced by the pins of said first assembly entering record card perforations, means for latching the pins of both assemblies in advanced position, means associated with the first assembly for releasing the pins thereof at approximately the quarter point of its operative cycle, means associated with the second assembly for releasing the pins thereof at approximately the beginning of the operative cycle of the first assembly, and means actuated by either the advance or return of a pin of the second assembly for effecting machine control.

20. In a machine of the class described, actuators capable of various extents of movement and operable in plural types of cycles; a movable pin box containing spring-pressed pins for governing the extent of movement of said actuators during one type of cycle; locking slides for said pins; means, including an intermittently operable cam shaft, under control of a perforated card, for changing the operation of the machine to another type of cycle; and means comprising a universal bail operable by said cam shaft for rendering ineffective the means for governing the extent of actuator movement.

21. In a machine of the class described, operable alternatively in accumulating or totaling cycles, means for sensing specially perforated records, a specially constructed bar operated by said sensing means, means including bars for detecting differences in consecutive data records, interponents optionally settable for actuation by any of said bars, a cam shaft adapted to be intermittently actuated by said bar or by said specially constructed bar to change the machine operation from that of an accumulating to that of a totaling cycle, and means controlled by said interponents to initiate the actuation of said cam shaft.

22. In a machine of the class described, the combination of record feeding means including a card picker, a totalizer and actuators therefor, a harmonically reciprocatory record sensing mechanism, a series of pins operable by said sensing mechanism to govern the extent of actuation of said actuators, means for locking said pins in their actuator controlling position, means for rendering said picker ineffective, means universal to said pin locking means for preventing the locking of said pins, and manually settable means actuated by said pins for controlling the actuation of the last two above named means.

23. In a machine of the class described, the combination of a prime mover, a main shaft, a clutch operatively interposed therebetween, card feeding and card sensing mechanism driven by said main shaft, a series of pins operable by said sensing mechanism, locking means for said pins, means for shifting said locking means to ineffective position, a cam actuated by said main shaft for control of said locking means, means including a rock shaft operable by said cam to control said shifting means, and means including a multiple controlled interponent also operable by said cam for disengaging said clutch.

24. In a machine of the class described, a record card sensing mechanism comprising a set of reciprocatory spring-pressed pins, a second set of reciprocatory spring-pressed pins individually advanced by selected pins of the first set entering card perforations, means for latching the second pins in advanced position, means for momentarily releasing the latched pins while the first pins are approximately at their limit of operative movement, and means actuated by either advance or return movement of a second pin for effecting machine control.

25. In a machine of the class described, a record card sensing mechanism comprising a set of reciprocatory spring-pressed pins, a second set of reciprocatory spring-pressed pins individually advanced by selected pins of the first set entering record card perforations, a spring-pressed slide for latching the second pins in advanced position, means for momentarily releasing the latched pins while the first pins are approximately at their limit of operative movement, and means actuated by either advance or return movement of a second pin for effecting machine control.

26. In a machine of the class described, a record card sensing mechanism comprising a set of reciprocatory spring-pressed pins, a second set of reciprocatory spring-pressed pins individually advanced by selected pins of the first set entering record card perforations, means for latching the second pins in advanced position, a cam actuated bail for momentarily releasing the latched pins while the first pins are approximately at their limit of operative movement, and means actuated by either advance or return movement of a second pin for effecting machine control.

27. In a machine of the class described, a record card sensing mechanism comprising a set of reciprocatory spring-pressed pins, a second set of reciprocatory spring-pressed pins individually advanced by selected pins of the first set entering record card perforations, means for latching the second pins in advanced position, means for momentarily releasing the latched pins while the first pins are approximately at their limit of operative movement, and a sensing slide actuated by either advance or return movement of a second pin for effecting machine control.

28. In a machine of the class described, a record card sensing mechanism comprising a set of reciprocatory spring-pressed pins, a second set of reciprocatory spring-pressed pins individually advanced by selected pins of the first set entering record card perforations, a reciprocable slide for latching the second pin in advanced position, a cam actuated bail for momentarily releasing the latched pins while the first pins are approximately at their limit of operative movement, and a sensing slide actuated by either advance or return movement of a second pin for effecting machine control.

WILLIAM W. LASKER.